United States Patent
Wang et al.

(10) Patent No.: US 12,027,680 B2
(45) Date of Patent: Jul. 2, 2024

(54) METHOD, APPARATUS, SYSTEM FOR DETECTING BATTERY THERMAL RUNAWAY, AND BATTERY MANAGEMENT UNIT

(71) Applicant: CONTEMPORARY AMPEREX TECHNOLOGY CO., LIMITED, Ningde (CN)

(72) Inventors: Xiao Wang, Ningde (CN); Chao Zeng, Ningde (CN); Jia Xu, Ningde (CN); Zhimin Dan, Ningde (CN); Yizhen Hou, Ningde (CN); Wei Zhang, Ningde (CN); Guoliang Hu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 782 days.

(21) Appl. No.: 17/130,972

(22) Filed: Dec. 22, 2020

(65) Prior Publication Data

US 2021/0111443 A1   Apr. 15, 2021

Related U.S. Application Data

(63) Continuation of application No. PCT/CN2019/100445, filed on Aug. 13, 2019.

(30) Foreign Application Priority Data

Apr. 30, 2019   (CN) .......................... 201910361841.8

(51) Int. Cl.
*H01M 10/48*   (2006.01)
*B60L 58/24*   (2019.01)
(Continued)

(52) U.S. Cl.
CPC .......... *H01M 10/486* (2013.01); *B60L 58/24* (2019.02); *H01M 10/4257* (2013.01);
(Continued)

(58) Field of Classification Search
CPC ............... H01M 10/48; H01M 10/486; H01M 10/4257; H01M 2010/4271; H01M 50/569; B60L 58/24; B60L 2250/10
See application file for complete search history.

(56) References Cited

U.S. PATENT DOCUMENTS

| 9,731,621 B2 | 8/2017 | Rawlinson |
| 2013/0049971 A1 | 2/2013 | Hermann |
| 2015/0194711 A1 | 7/2015 | Rawlinson |

FOREIGN PATENT DOCUMENTS

| CN | 1163345 A | 10/1997 |
| CN | 101732044 A | 6/2010 |

(Continued)

OTHER PUBLICATIONS

English translation of CN Publication 106569142, Apr. 2017.*
(Continued)

*Primary Examiner* — Brittany L Raymond
(74) *Attorney, Agent, or Firm* — Kilpatrick Townsend & Stockton LLP

(57) ABSTRACT

This application provides a method, an apparatus, a system for detecting battery thermal runaway, and a battery management unit. The method includes: obtaining an output signal of an air pressure sensor located in a battery pack, and obtaining parameter information of the battery pack; determining state information of the air pressure sensor based on the output signal of the air pressure sensor; and generating an alarm signal indicating occurrence of thermal runaway in the battery pack based on the state information of the air pressure sensor and the parameter information of the battery
(Continued)

pack. In this application, the thermal runaway detection for the battery pack may be implemented by considering parameter information of both the air pressure sensor and the battery pack, improving the reliability of the thermal runaway detection for the battery pack, reducing the probability of false positives and false negatives, and improving driving safety.

15 Claims, 8 Drawing Sheets

(51) Int. Cl.
  *H01M 10/42* (2006.01)
  *H01M 50/569* (2021.01)
(52) U.S. Cl.
  CPC .. *B60L 2250/10* (2013.01); *H01M 2010/4271* (2013.01); *H01M 50/569* (2021.01)

(56) References Cited

FOREIGN PATENT DOCUMENTS

| | | | |
|---|---|---|---|
| CN | 201673006 U | | 12/2010 |
| CN | 201898180 U | | 7/2011 |
| CN | 203377336 U | | 1/2014 |
| CN | 103712741 A | | 4/2014 |
| CN | 104884121 A | | 9/2015 |
| CN | 106532146 A | | 3/2017 |
| CN | 206022563 U | | 3/2017 |
| CN | 106569142 | * | 4/2017 |
| CN | 106569142 A | | 4/2017 |
| CN | 206067536 U | | 4/2017 |
| CN | 206134865 U | | 4/2017 |
| CN | 107117155 | * | 9/2017 |
| CN | 107117155 A | | 9/2017 |
| CN | 107124907 A | | 9/2017 |
| CN | 107240724 A | | 10/2017 |
| CN | 107394297 A | | 11/2017 |
| CN | 108519205 A | | 9/2018 |
| CN | 207925620 U | | 9/2018 |
| CN | 108631015 A | | 10/2018 |
| CN | 109017363 A | | 12/2018 |
| CN | 109585946 A | | 4/2019 |
| CN | 109586252 | * | 4/2019 |
| CN | 109586252 A | | 4/2019 |

OTHER PUBLICATIONS

English translation of CN Publication 109586252, Apr. 2019.*
English translation of CN Publication 107117155, Sep. 2017.*
Ningder Age Man Software Technology Co. Ltd., First Office Action, CN201910361841.8, Jul. 29, 2020, 8 pgs.
Contemporary Amperex Technology Co., Limited, Second Office Action, CN201910361841.8, Nov. 17, 2020, 9 pgs.
Ningder Age New Energy Technology Co. Ltd., First Office Action, CN202110169408.1, Dec. 10, 2021, 10 pgs.
Contemporary Amperex Technology Co., Limited, Extended European Search Report, EP19926818.6, Sep. 15, 2021, 8 pgs.
Contemporary Amperex Technology Co., Limited, International Search Report and Written Opinion, PCT/CN2019/100445, Feb. 20, 2020, 6 pgs.

* cited by examiner

| | | |
|---|---|---|
| Condition_1 | Vmin < 2.0V (300ms) + Tmax > 68°C (2s) | Point-to-point fault in 0 minutes |
| Condition_2 | Vmin < 2.0V (300ms) + dT/dt > 3°C/s (2s) | Point-to-point fault in 0 minutes |
| Condition_3 | Vmin < 2.0V (300ms) + Tmax−Tmin > 30°C (2s) | Point-to-point fault in 0 minutes |
| Condition_4 | dT/dt > 3°C/s (2s) + Tmax > 68°C (2s) | Point-to-point fault in 0 minutes |
| Condition_5 | dT/dt > 3°C/s (2s) + Tmax−Tmin > 30°C (2s) | Point-to-point fault in 0 minutes |
| Condition_6 | Voltage sampling open-circuit fault count >= 1 + Tmax > 68°C (2s) | Point-to-point fault |
| Condition_7 | Voltage sampling open-circuit fault count >= 1 + dT/dt > 3°C/s (2s) | Point-to-point fault |
| Condition_8 | Voltage sampling open-circuit fault count >= 1 + Tmax−Tmin > 30°C (2s) | Point-to-point fault |
| Condition_9 | Voltage sampling open-circuit fault count >= 1 + NTCs within a same module totally fail | Point-to-point fault |
| Condition_11 (overcharge) | Vmax > 1.1* Level-3 overvoltage + TRD_SOC > 115% Charge Current >= 0.33C | Vmonitored range ≥ 6% |

- Combinations of voltage and temperature: Conditions 1–5
- Combinations of voltage sampling faults and temperature: Conditions 6–9
- Overcharge warning: Condition 11

FIG. 7

METHOD, APPARATUS, SYSTEM FOR DETECTING BATTERY THERMAL RUNAWAY, AND BATTERY MANAGEMENT UNIT

CROSS REFERENCE TO RELATED APPLICATIONS

This application is a continuation application of PCT Patent Application No. PCT/CN2019/100445, entitled "THERMAL RUNAWAY DETECTION METHOD, DEVICE AND SYSTEM FOR BATTERIES, AND BATTERY MANAGEMENT UNIT" filed on Aug. 13, 2019, which claims priority to Chinese Patent Application No. 201910361841.8, filed with the State Intellectual Property Office of the People's Republic of China on Apr. 30, 2019, and entitled "METHOD, APPARATUS, SYSTEM FOR DETECTING BATTERY THERMAL RUNAWAY, AND BATTERY MANAGEMENT UNIT", all of which are incorporated herein by reference in their entirety.

TECHNICAL FIELD

This application relates to the battery field, and in particular, to a method, an apparatus, a system for detecting battery thermal runaway, and a battery management unit.

BACKGROUND

A traction battery absolutely generates heat when it works, and the battery is controllable in a normal state, but will be out of control in an abnormal state (such as collision and/or over-charging). Once thermal runaway occurs, a high temperature and a destructive power are produced quickly, which might burn through the top box of a battery cabinet and set off a fire, thereby endangering the personal safety of passengers, and leading to a major safety accident. As is required in the market, energy density of a traction battery increases continually, and the demands for battery safety by the market are increasingly high. Therefore, it is necessary to monitor and alarm in real time on whether thermal runaway is occurring in a traction battery.

For the existing module design, a flexible printed circuit board (Flexible Printed Circuit Board, FPC for short) or an internal cell supervision circuit (Cell Supervision Circuit, CSC for short) is located on an explosion-proof valve of a battery cell. Once thermal runaway occurs, an electrolyte with high temperature can sputter to the FPC or internal CSC which is then burnt out and unable to communicate with a battery management unit (Battery Management Unit, BMU for short). In this situation, an existing battery management system (Battery Management System, BMS for short) is unable to detect the occurrence of thermal runaway and accordingly is unable to issue an alarm, thereby endangering the personal safety of passengers.

The existing BMS or some thermal runaway monitoring schemes currently available in the market tend to have false positives and false negatives, which not only affects the driving experience of the driver, but also endangers the personal safety of the passengers. The driving safety is low.

SUMMARY

Embodiments of this application provide a method, an apparatus, a system for detecting battery thermal runaway, and a battery management unit, to implement thermal runaway detection for a battery pack by combining parameter information of an air pressure sensor and the battery pack, so as to improve the reliability of thermal runaway detection for a battery pack, reduce the probability of false positives and false negatives, and improve the driving safety.

According to a first aspect, an embodiment of this application provides a method for detecting battery thermal runaway, including: obtaining an output signal of an air pressure sensor located in a battery pack, and obtaining parameter information of the battery pack; determining state information of the air pressure sensor based on the output signal of the air pressure sensor; generating an alarm signal indicating occurrence of thermal runaway in the battery pack based on the state information of the air pressure sensor and the parameter information of the battery pack.

In some embodiments, after the generating an alarm signal indicating occurrence of thermal runaway in the battery pack, the method further includes: sending the alarm signal indicating occurrence of thermal runaway in the battery pack to a vehicle control unit of a vehicle with the battery pack mounted.

In some embodiments, the obtaining an output signal of an air pressure sensor located in a battery pack includes: when a battery management unit of the battery pack is in a normal working state, obtaining an output voltage of the air pressure sensor located in the battery pack; the determining state information of the air pressure sensor based on the output signal of the air pressure sensor includes: when the output voltage of the air pressure sensor is less than a predetermined first voltage threshold, determining that the air pressure sensor is in a normal working state; when the output voltage of the air pressure sensor is greater than or equal to the predetermined first voltage threshold, determining that the air pressure sensor is in an air pressure alarm state; when the output voltage of the air pressure sensor is in a predetermined faulty voltage range, determining that the air pressure sensor is in a faulty state.

In some embodiments, the obtaining an output signal of an air pressure sensor located in a battery pack includes: when the battery management unit of the battery pack is in a sleeping state, obtaining a logic signal output from the air pressure sensor located in the battery pack; the determining state information of the air pressure sensor based on the output signal of the air pressure sensor includes: when the logic signal is a high level signal, after the battery management unit of the battery pack is waken up from the sleeping state, determining that the air pressure sensor is in an air pressure alarm state.

In some embodiments, the generating an alarm signal indicating occurrence of thermal runaway in the battery pack based on the state information of the air pressure sensor and the parameter information of the battery pack includes: when the air pressure sensor is in an air pressure alarm state, generating the alarm signal indicating occurrence of thermal runaway in the battery pack if any one or more of fault conditions in the parameter information of the battery pack is/are satisfied within a predetermined detection time; where the fault conditions in the parameter information of the battery pack include:

a time in which a highest temperature of a battery cell in the battery pack is greater than a predetermined temperature threshold exceeds a first time threshold;

a time in which a temperature rise rate of a battery cell in the battery pack over time is greater than a predetermined rise rate threshold exceeds a second time threshold;

a time in which a difference between a highest temperature and a lowest temperature of a battery cell in the battery pack is greater than a predetermined difference threshold exceeds a third time threshold;

a time in which a lowest voltage of a battery cell in the battery pack is lower than a predetermined second voltage threshold exceeds a fourth time threshold;

a voltage sampling open-circuit fault count of the battery pack is greater than or equal to a predetermined fault count threshold;

temperature sensors within a same module of the battery pack totally fail; and communication between a cell supervision circuit of the battery pack and the battery management unit is completely lost.

In some embodiments, the generating an alarm signal indicating occurrence of thermal runaway in the battery pack based on the state information of the air pressure sensor and the parameter information of the battery pack includes: when the air pressure sensor is in a normal working state or a faulty state, generating the alarm signal indicating occurrence of thermal runaway in the battery pack if any one or more of fault conditions in the parameter information of the battery pack is/are satisfied; where the fault conditions in the parameter information of the battery pack include:

within a predetermined detection time, a time in which a lowest voltage of a battery cell in the battery pack is lower than the predetermined second voltage threshold exceeds the fourth time threshold, and a time in which a highest temperature of a battery cell in the battery pack is greater than the predetermined temperature threshold exceeds the first time threshold;

within a predetermined detection time, a time in which a lowest voltage of a battery cell in the battery pack is lower than the predetermined second voltage threshold exceeds the fourth time threshold, and a time in which a temperature rise rate of a battery cell in the battery pack over time is greater than the predetermined rise rate threshold exceeds the second time threshold;

within a predetermined detection time, a time in which a lowest voltage of a battery cell in the battery pack is lower than the predetermined second voltage threshold exceeds the fourth time threshold, and a time in which a difference between a highest temperature and a lowest temperature of a battery cell in the battery pack is greater than the predetermined difference threshold exceeds the third time threshold;

within a predetermined detection time, a time in which a temperature rise rate of a battery cell in the battery pack over time is greater than the predetermined rise rate threshold exceeds the second time threshold, and a time in which a highest temperature of a battery cell in the battery pack is greater than the predetermined temperature threshold exceeds the first time threshold;

within a predetermined detection time, a time in which a temperature rise rate of a battery cell in the battery pack over time is greater than the predetermined rise rate threshold exceeds the second time threshold, and a time in which a difference between a highest temperature and a lowest temperature of a battery cell in the battery pack is greater than the predetermined difference threshold exceeds the third time threshold;

a voltage sampling open-circuit fault count of the battery pack is greater than or equal to a predetermined fault count threshold, and a time in which a highest temperature of a battery cell in the battery pack is greater than the predetermined temperature threshold exceeds the first time threshold;

a voltage sampling open-circuit fault count of the battery pack is greater than or equal to the predetermined fault count threshold, and a time in which the temperature rise rate of a battery cell in the battery pack over time is greater than the predetermined rise rate threshold exceeds the second time threshold;

a voltage sampling open-circuit fault count of the battery pack is greater than or equal to the predetermined fault count threshold, and a time in which a difference between a highest temperature and a lowest temperature of a battery cell in the battery pack is greater than the predetermined difference threshold exceeds the third time threshold;

a voltage sampling open-circuit fault count of the battery pack is greater than or equal to the predetermined fault count threshold, and temperature sensors within a same module of the battery pack totally fail; and a charging state of a battery cell in the battery pack satisfies the following conditions, and lasts for a time greater than or equal to a predetermined time: a highest voltage of a battery cell in the battery pack is greater than the predetermined third voltage threshold, and a real value of state of charge of the battery cell in the battery pack is greater than a predetermined threshold, and a charging current of the battery cell in the battery pack is greater than or equal to a predetermined charging current threshold.

According to a second aspect, an embodiment of this application provides an apparatus for detecting battery thermal runaway, including: an obtaining module, configured to obtain an output signal of an air pressure sensor located in a battery pack, and obtain parameter information of the battery pack; a determining module, configured to determine state information of the air pressure sensor based on the output signal of the air pressure sensor obtained by the obtaining module; a generating module, configured to generate an alarm signal indicating occurrence of thermal runaway in the battery pack based on the state information of the air pressure sensor and the parameter information of the battery pack obtained by the obtaining module.

In some embodiments, the apparatus further includes: a sending module, configured to send the alarm signal indicating occurrence of thermal runaway in the battery pack to a vehicle control unit of a vehicle with the battery pack mounted after the generating module generates the alarm signal indicating occurrence of thermal runaway in the battery pack.

In some embodiments, the obtaining module is specifically configured to obtain an output voltage of the air pressure sensor located in the battery pack when a battery management unit of the battery pack is in a normal working state.

The determining module is specifically configured to: determine that the air pressure sensor is in a normal working state when the output voltage of the air pressure sensor is less than a predetermined first voltage threshold; determine that the air pressure sensor is in an air pressure alarm state when the output voltage of the air pressure sensor is greater than or equal to the predetermined first voltage threshold; and determine that the air pressure sensor is in a faulty state when the output voltage of the air pressure sensor is in a predetermined faulty voltage range.

In some embodiments, the obtaining module is specifically configured to obtain a logic signal output from the air pressure sensor located in the battery pack when the battery management unit of the battery pack is in a sleeping state.

The determining module is specifically configured to, when the logic signal is a high level signal, after the battery management unit of the battery pack is waken up from the sleeping state, determine that the air pressure sensor is in an air pressure alarm state.

In some embodiments, the generating module is specifically configured to: when the air pressure sensor is in an air pressure alarm state, generate the alarm signal indicating occurrence of thermal runaway in the battery pack if any one or more of fault conditions in the parameter information of the battery pack is/are satisfied within a predetermined detection time; where the fault conditions in the parameter information of the battery pack include:

a time in which a highest temperature of a battery cell in the battery pack is greater than a predetermined temperature threshold exceeds a first time threshold;

a time in which a temperature rise rate of a battery cell in the battery pack over time is greater than a predetermined rise rate threshold exceeds a second time threshold;

a time in which a difference between a highest temperature and a lowest temperature of a battery cell in the battery pack is greater than a predetermined difference threshold exceeds a third time threshold;

a time in which a lowest voltage of a battery cell in the battery pack is lower than a predetermined second voltage threshold exceeds a fourth time threshold;

a voltage sampling open-circuit fault count of the battery pack is greater than or equal to a predetermined fault count threshold;

temperature sensors within a same module of the battery pack totally fail; and communication between a cell supervision circuit of the battery pack and the battery management unit is completely lost.

In some embodiments, the generating module is specifically configured to, when the air pressure sensor is in a normal working state or a faulty state, generate the alarm signal indicating occurrence of thermal runaway in the battery pack if any one or more of fault conditions in the parameter information of the battery pack is/are satisfied; where the fault conditions in the parameter information of the battery pack include:

within a predetermined detection time, a time in which a lowest voltage of a battery cell in the battery pack is lower than the predetermined second voltage threshold exceeds the fourth time threshold, and a time in which a highest temperature of a battery cell in the battery pack is greater than the predetermined temperature threshold exceeds the first time threshold;

within a predetermined detection time, a time in which a lowest voltage of a battery cell in the battery pack is lower than the predetermined second voltage threshold exceeds the fourth time threshold, and a time in which a temperature rise rate of a battery cell in the battery pack over time is greater than the predetermined rise rate threshold exceeds the second time threshold;

within a predetermined detection time, a time in which a lowest voltage of a battery cell in the battery pack is lower than the predetermined second voltage threshold exceeds the fourth time threshold, and a time in which a difference between a highest temperature and a lowest temperature of a battery cell in the battery pack is greater than the predetermined difference threshold exceeds the third time threshold;

within a predetermined detection time, a time in which a temperature rise rate of a battery cell in the battery pack over time is greater than the predetermined rise rate threshold exceeds the second time threshold, and a time in which a highest temperature of a battery cell in the battery pack is greater than the predetermined temperature threshold exceeds the first time threshold;

within a predetermined detection time, a time in which a temperature rise rate of a battery cell in the battery pack over time is greater than the predetermined rise rate threshold exceeds the second time threshold, and a time in which a difference between a highest temperature and a lowest temperature of a battery cell in the battery pack is greater than the predetermined difference threshold exceeds the third time threshold;

a voltage sampling open-circuit fault count of the battery pack is greater than or equal to a predetermined fault count threshold, and a time in which a highest temperature of a battery cell in the battery pack is greater than the predetermined temperature threshold exceeds the first time threshold;

a voltage sampling open-circuit fault count of the battery pack is greater than or equal to the predetermined fault count threshold, and a time in which a temperature rise rate of a battery cell in the battery pack over time is greater than the predetermined rise rate threshold exceeds the second time threshold;

a voltage sampling open-circuit fault count of the battery pack is greater than or equal to the predetermined fault count threshold, and a time in which a difference between a highest temperature and a lowest temperature of a battery cell in the battery pack is greater than the predetermined difference threshold exceeds the third time threshold;

a voltage sampling open-circuit fault count of the battery pack is greater than or equal to the predetermined fault count threshold, and temperature sensors within a same module of the battery pack totally fail; and a charging state of a battery cell satisfies the following conditions, and lasts for a time greater than or equal to a predetermined time: a highest voltage of a battery cell in the battery pack is greater than the predetermined third voltage threshold, and a real value of state of charge of the battery cell in the battery pack is greater than a predetermined threshold, and a charging current of the battery cell in the battery pack is greater than or equal to a predetermined charging current threshold.

According to a third aspect, an embodiment of this disclosure provides a battery management unit, including: a memory, a processor, and a plurality of computer programs stored in the memory that, when executed by the processor, cause the battery management unit to perform the aforementioned method.

According to a fourth aspect, an embodiment of this application provides a system for detecting battery thermal runaway, including an air pressure sensor located in a battery pack and the foregoing battery management unit.

According to a fifth aspect, an embodiment of this disclosure provides a non-transitory computer-readable storage medium storing a plurality of computer programs thereon that, when executed by a processor, cause the processor to perform the foregoing method.

In the foregoing technical solutions, after the output signal of the air pressure sensor located in the battery pack and the parameter information of the battery pack are obtained, the state information of the air pressure sensor is determined based on the output signal of the air pressure sensor, and finally the alarm signal indicating occurrence of thermal runaway in the battery pack is generated based on the state information of the air pressure sensor and the parameter information of the battery pack. In this way, the thermal runaway detection for the battery pack can be implemented by considering parameter information of both the air pressure sensor and the battery pack, improving the reliability of the thermal runaway detection for the battery pack, reducing the probability of false positives and false negatives, and improving driving safety.

BRIEF DESCRIPTION OF DRAWINGS

To describe the technical solutions in the embodiments of this disclosure more clearly, the following briefly describes the accompanying drawings required for describing the embodiments. Apparently, the accompanying drawings in the following description show merely some embodiments of this disclosure, and a person of ordinary skill in the art may still derive other drawings from these accompanying drawings without creative efforts.

FIG. 7 is a schematic diagram of another embodiment of a thermal runaway alarm policy in the method for detecting battery thermal runaway according to this application;

DESCRIPTION OF EMBODIMENTS

To help better understand the technical solutions of this disclosure, the following describes in detail the embodiments of this application with reference to the accompanying drawings.

Apparently, the described embodiments are merely some but not all of the embodiments of this application. All other embodiments obtained by a person of ordinary skill in the art based on the embodiments of this application without creative efforts shall fall within the protection scope of this application.

The terms used in the embodiments of this application are merely for the purpose of illustrating specific embodiments, and are not intended to limit this application. The terms "a", "the" and "this" of singular forms used in the embodiments and the appended claims of this application are also intended to include plural forms, unless otherwise specified in the context clearly.

Figure 1:
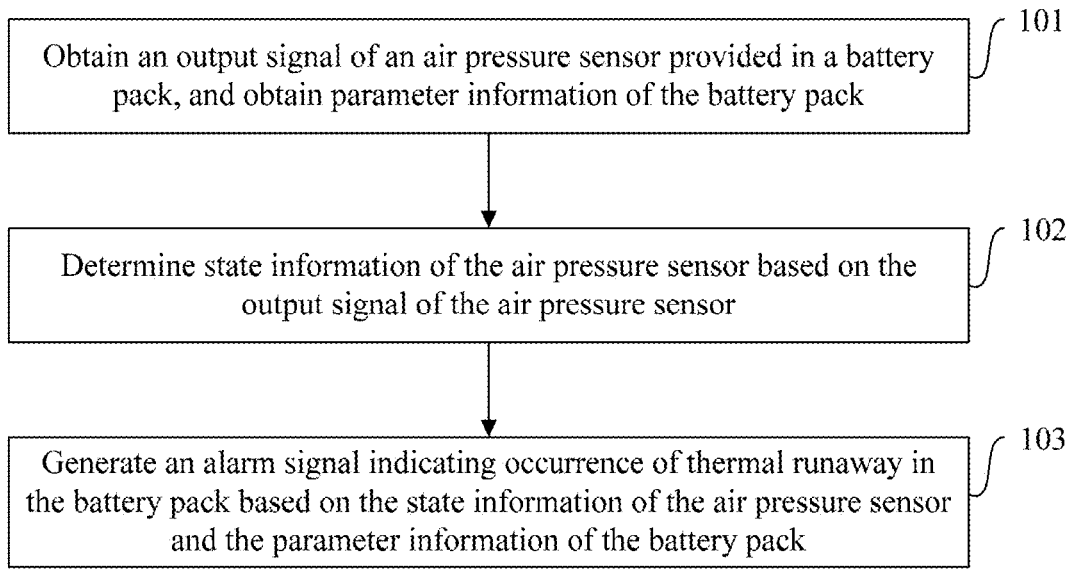
FIG. 1 is a flowchart of an embodiment of a method for detecting battery thermal runaway according to this application.

FIG. 1 is a flowchart of an embodiment of a method for detecting battery thermal runaway according to this application. The method for detecting battery thermal runaway provided by this embodiment may be executed by a BMU. As shown in FIG. 1, the method for detecting battery thermal runaway may include:

Step 101. Obtain an output signal of an air pressure sensor located in a battery pack, and obtain parameter information of the battery pack.

In this embodiment, the battery pack includes a plurality of battery cells, and the air pressure sensor may be provided in the battery pack. Simulation and experimental results show that the air pressure is distributed evenly across all locations within the battery pack (Pack) when thermal runaway occurs in a battery cell of the battery pack. Therefore, the air pressure sensor may be arranged at any location within the battery pack (Pack).

In a specific implementation, the air pressure sensor may employ a dual-channel air pressure sensor. Certainly, other types of air pressure sensors may be employed, and this is not limited in this embodiment.

Step 102. Determine the state information of the air pressure sensor based on the output signal of the air pressure sensor.

Step 103. Generate an alarm signal indicating occurrence of thermal runaway in the battery pack based on the state information of the air pressure sensor and the parameter information of the battery pack.

In the foregoing method for detecting battery thermal runaway, after the output signal of the air pressure sensor located in the battery pack and the parameter information of the battery pack are obtained, the state information of the air pressure sensor is determined based on the output signal of the air pressure sensor, and finally the alarm signal indicating occurrence of thermal runaway in the battery pack is generated based on the state information of the air pressure sensor and the parameter information of the battery pack. In this way, the thermal runaway detection for the battery pack can be implemented by considering parameter information of both the air pressure sensor and the battery pack, improving the reliability of the thermal runaway detection for the battery pack, reducing the probability of false positives and false negatives, and improving driving safety.

Figure 2:
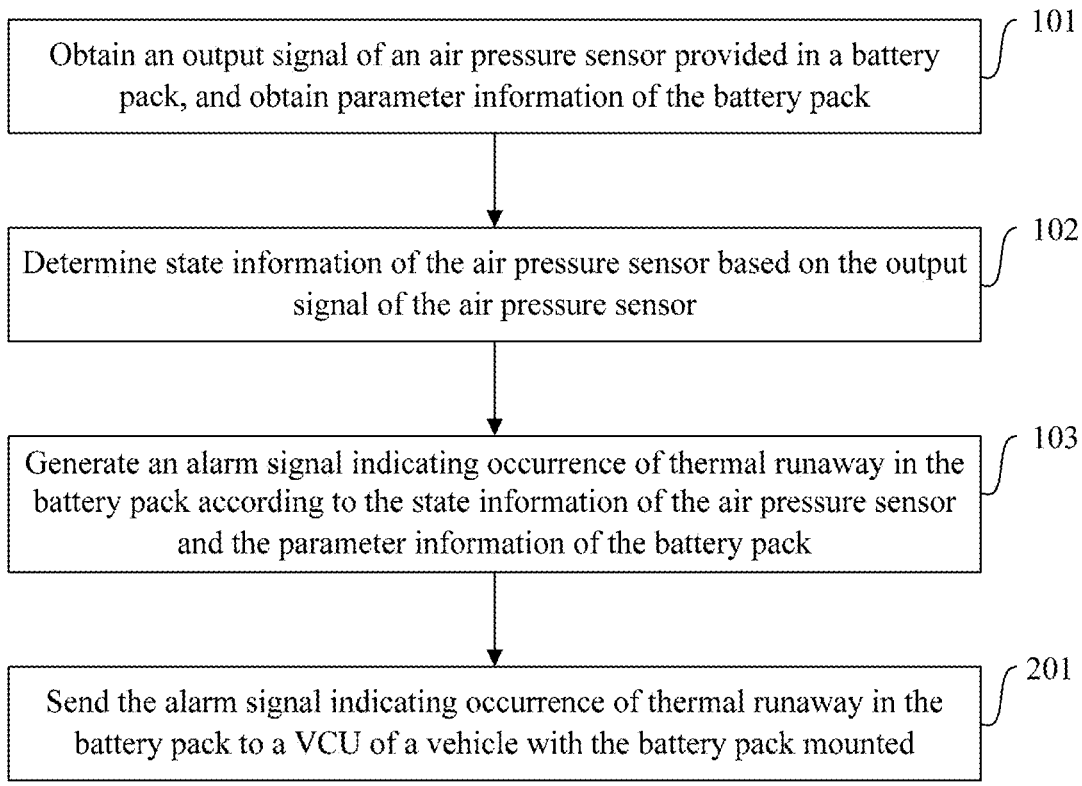
FIG. 2 is a flowchart of another embodiment of the method for detecting battery thermal runaway according to this application.

FIG. 2 is a flowchart of another embodiment of the method for detecting battery thermal runaway according to this application. As shown in FIG. 2, in the embodiment shown in FIG. 1 of this application, after the step 103, the method may further include:

Step 201. Send the alarm signal indicating occurrence of thermal runaway in the battery pack to a vehicle control unit (Vehicle Control Unit, VCU for short) of a vehicle with the battery pack mounted.

Specifically, after generating the thermal runaway alarm signal, the BMU may send the alarm signal to a VCU of a vehicle with the battery pack mounted. Then the thermal runaway fault occurring in the battery pack is handled by the VCU according to a preset policy, for example, generating a sound and light alarm.

Figure 3:
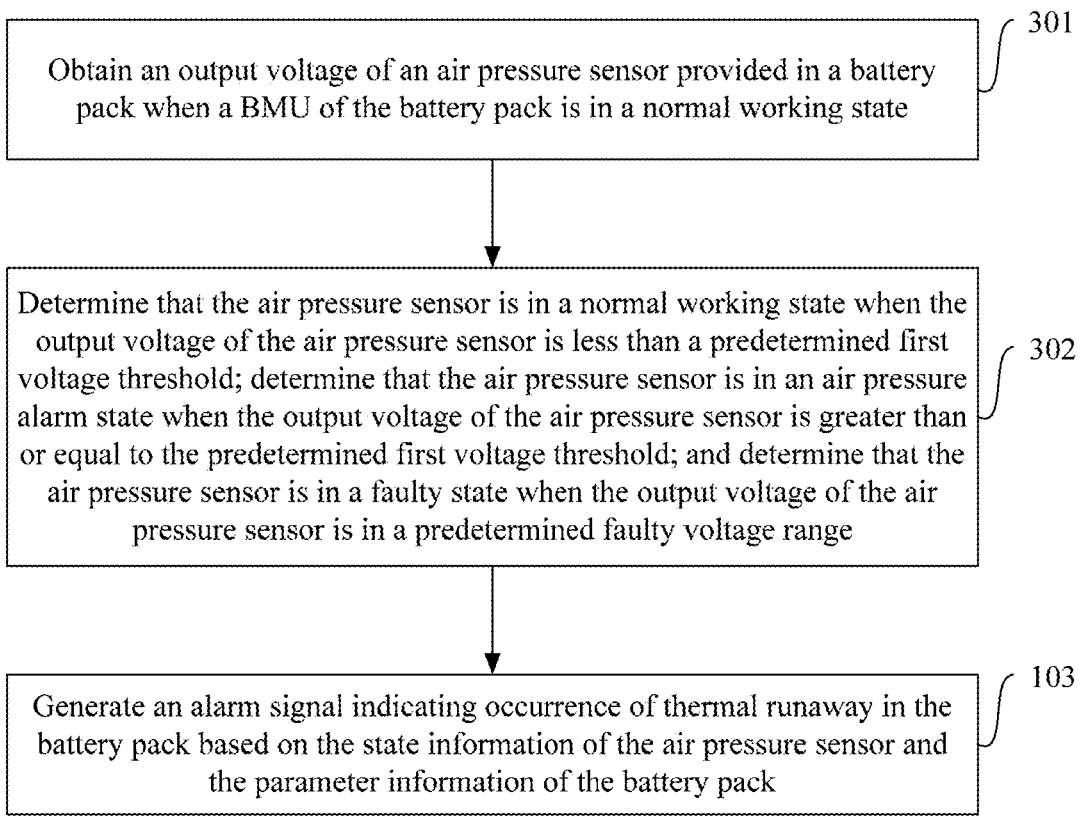
FIG. 3 is a flowchart of a further embodiment of the method for detecting battery thermal runaway according to this application.

FIG. 3 is a flowchart of a further embodiment of the method for detecting battery thermal runaway according to this application. As shown in FIG. 3, in the embodiment shown in FIG. 1 of this application, the step 101 may be:

Step 301. Obtain an output voltage of the air pressure sensor located in the battery pack when a BMU of the battery pack is in a normal working state.

Figure 4:
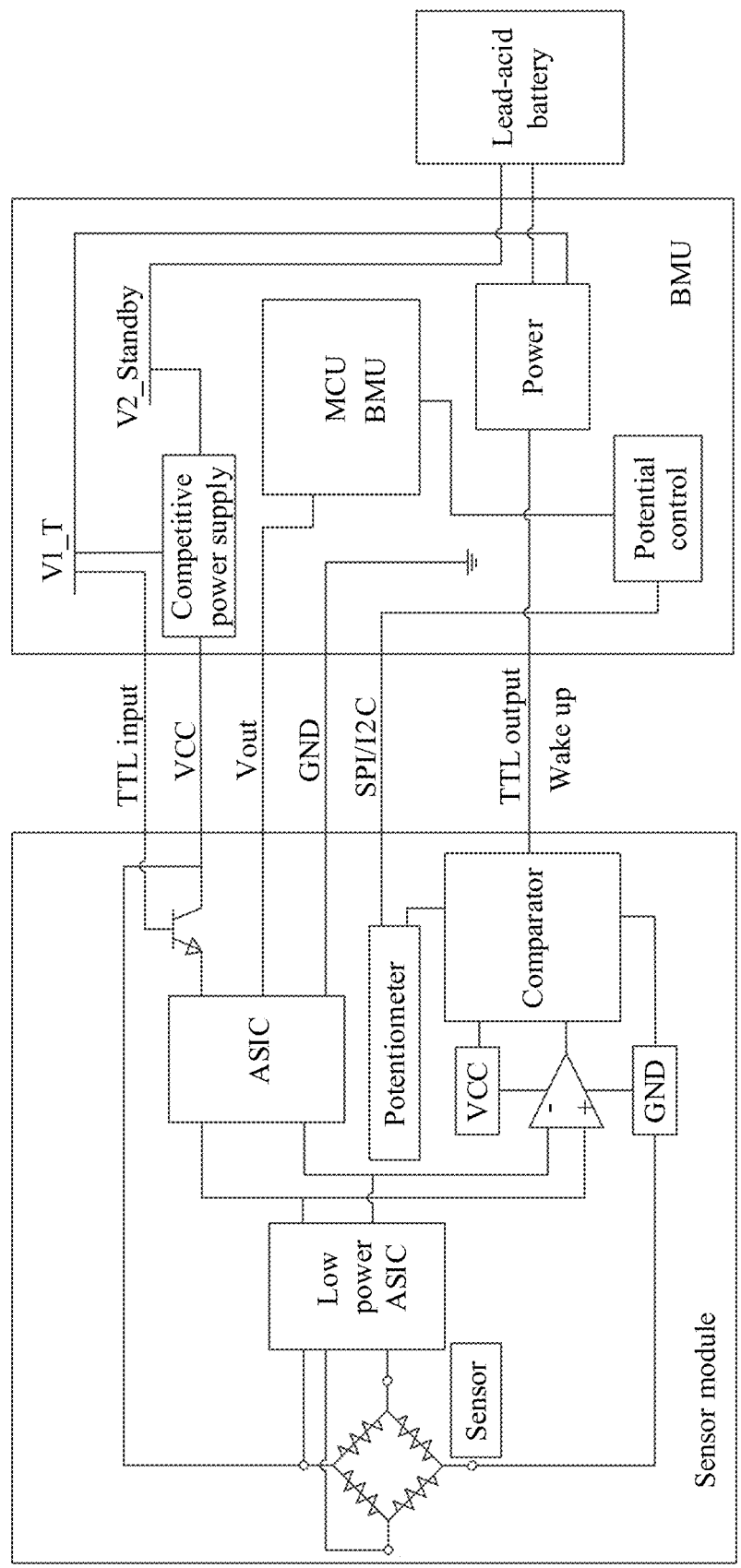
FIG. 4 is a circuit topological structure diagram of an air pressure sensor in the method for detecting battery thermal runaway according to this application.

FIG. 4 is a circuit topological structure diagram of an air pressure sensor in the method for detecting battery thermal runaway according to this application. The sensor module in FIG. 4 is the air pressure sensor. In this embodiment, when the BMU is working normally, the air pressure sensor is in a normal working state, V1_T is powered up, and a triode is turned on, so that an application specific integrated circuit (ASIC) starts to work while a low power application specific integrated circuit (Low Power ASIC) is not working. At this time, the output signal of the air pressure sensor is an output voltage value Vout in real time. A voltage value of V1_T may be set according to system performance and/or implementation demands in a specific implementation, and the voltage value of V1_T is not limited in this embodiment. For example, the voltage value of V1_T may be 12.0 V.

In this case, the step 102 may be:

Step 302. Determine that the air pressure sensor is in a normal working state when the output voltage of the air pressure sensor is less than a predetermined first voltage threshold; determine that the air pressure sensor is in an air pressure alarm state when the output voltage of the air pressure sensor is greater than or equal to the predetermined first voltage threshold; and determine that the air pressure sensor is in a faulty state when the output voltage of the air pressure sensor is in a predetermined faulty voltage range.

The predetermined first voltage threshold may be set according to system performance and/or implementation demands in a specific implementation, and the value of the predetermined first voltage threshold is not limited in this embodiment. Again, the predetermined faulty voltage range may also be set according to system performance and/or implementation demands in a specific implementation, and the value of the predetermined faulty voltage range is not limited in this embodiment. For example, the predetermined faulty voltage range may be 0-0.2 V and 4.8-5 V.

Considering that the function of detecting thermal runaway may be lost when the air pressure sensor fails, in this embodiment, the air pressure sensor has a self-diagnostic function under a normal working state. Once the output voltage value of the air pressure sensor is in the predetermined faulty voltage range (that is, 0-0.2 V & 4.8-5 V), the air pressure sensor is determined to be in a faulty state. However, the air pressure sensor has no diagnostic function under a low power consumption working state.

Additionally, because what the air pressure sensor detects is air pressure within the pack, considering that different atmospheric pressure in different regions might cause the air pressure sensor to wrongly issue an air pressure alarm signal, a potentiometer may be added in the air pressure sensor so as to calibrate the air pressure alarm threshold within the pack in real time with an outside air pressure value acquired in a normal situation.

Figure 5:
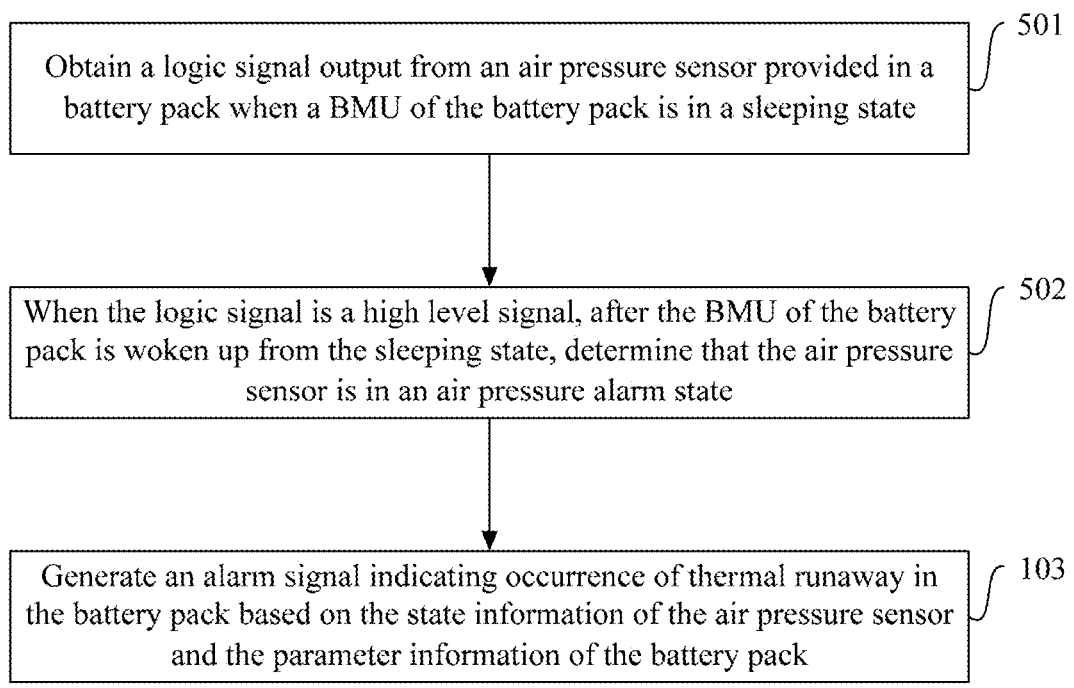
FIG. 5 is a flowchart of a further embodiment of the method for detecting battery thermal runaway according to this application.

FIG. 5 is a flowchart of a further embodiment of the method for detecting battery thermal runaway according to this application. As shown in FIG. 5, in the embodiment shown in FIG. 1 of this application, the step 101 may be:

Step 501. Obtain a logic signal output from the air pressure sensor located in the battery pack when a BMU of the battery pack is in a sleeping state.

The logic signal may be a logic gate circuit (Transistor-Transistor Logic, TTL for short) signal.

Referring to FIG. 4, when the BMU is in a sleeping state, the air pressure sensor is in a low power consumption working state, V1_T is powered off, and the triode is not turned on, so that the ASIC is not working, while V2_Standby with a constant power is powered by a lead-acid battery, and the Low Power ASIC is working. At this time, the air pressure sensor outputs a TTL signal through a comparator. A voltage value of V2_Standby may be set according to system performance and/or implementation demands in a specific implementation, and the voltage value of V2_Standby is not limited in this embodiment. For example, the voltage value of V2_Standby may be 5.0 V.

In this case, the step 102 may be:

Step 502. When the logic signal is a high level signal, after the BMU of the battery pack is waken up from the sleeping state, determine that the air pressure sensor is in an air pressure alarm state.

Specifically, when the BMU of the battery pack is in a sleeping state, the air pressure sensor outputs a low level signal in a normal situation. At this time, the working state of the BMU does not change, and the BMU remains in the sleeping state; however, when the air pressure sensor outputs a high level signal, the BMU of the battery pack is waken up from the sleeping state and starts to work, and the air pressure sensor is determined to be in an air pressure alarm state.

In this embodiment, the air pressure sensor is capable of monitoring thermal runaway of the battery pack in a low power consumption working state, so that the air pressure sensor can work uninterruptedly, providing the thermal runaway detection and alarm function even when the vehicle stops and is powered down.

In an implementation of the embodiments shown in FIG. 3 and FIG. 5 of this application, the step 103 may be:

when the air pressure sensor is in an air pressure alarm state, generating the alarm signal indicating occurrence of thermal runaway in the battery pack if any one or more of fault conditions in the parameter information of the battery pack is/are satisfied within a predetermined detection time; where the fault conditions in the parameter information of the battery pack include:

a time in which a highest temperature of a battery cell in the battery pack is greater than a predetermined temperature threshold exceeds a first time threshold;

a time in which a temperature rise rate of a battery cell in the battery pack over time is greater than a predetermined rise rate threshold exceeds a second time threshold;

a time in which a difference between a highest temperature and a lowest temperature of a battery cell in the battery pack is greater than a predetermined difference threshold exceeds a third time threshold;

a time in which a lowest voltage of a battery cell in the battery pack is lower than a predetermined second voltage threshold exceeds a fourth time threshold;

a voltage sampling open-circuit fault count of the battery pack is greater than or equal to a predetermined fault count threshold;

temperature sensors within a same module of the battery pack totally fail; and communication between a CSC of the battery pack and the BMU is completely lost.

The predetermined detection time may be set according to system performance and/or implementation demands in a specific implementation, and the length of the predetermined detection time is not limited in this embodiment. For example, the predetermined detection time may be 10 minutes.

The value of the predetermined temperature threshold may be set according to system performance and/or implementation demands in a specific implementation, and the value of the predetermined temperature threshold is not limited in this embodiment. For example, the predetermined temperature threshold may be 68.4° C.

The first time threshold may be set according to system performance and/or implementation demands in a specific implementation, and the length of the first time threshold is not limited in this embodiment. For example, the first time threshold may be 2 seconds.

The temperature rise rate of the battery cell over time is dT/dt, and the predetermined rise rate threshold may be set according to system performance and/or implementation demands in a specific implementation, and the value of the predetermined rise rate threshold is not limited in this embodiment. For example, the predetermined rise rate threshold may be 3° C./s.

The second time threshold may be set according to system performance and/or implementation demands in a specific implementation, and the length of the second time threshold is not limited in this embodiment. For example, the second time threshold may be equal or not equal to the first time threshold, and this is not limited in this embodiment. This embodiment is illustrated by using the second time threshold being equal to the first time threshold as an example, and the second time threshold may be 2 seconds.

The predetermined difference threshold may be set according to system performance and/or implementation demands in a specific implementation, and the value of the predetermined difference threshold is not limited in this embodiment. For example, the predetermined difference threshold may be 30° C.

The third time threshold may be set according to system performance and/or implementation demands in a specific implementation, and the length of the third time threshold is not limited in this embodiment. For example, the third time threshold may be equal or not equal to the first time threshold, and equal or not equal to the second time threshold, and this is not limited in this embodiment. This embodiment is illustrated by using the third time threshold being equal to both the first time threshold and the second time threshold as an example, and the third time threshold may be 2 seconds.

The predetermined second voltage threshold may be set according to system performance and/or implementation demands in a specific implementation, and the value of the predetermined second voltage threshold is not limited in this embodiment. For example, the predetermined second voltage threshold may be 2.0 V.

The fourth time threshold may be set according to system performance and/or implementation demands in a specific implementation, and the length of the fourth time threshold is not limited in this embodiment. For example, the fourth time threshold may be equal or not equal to the first time threshold, the second time threshold, and the third time threshold, and this is not limited in this embodiment. This embodiment is illustrated by using the fourth time threshold being not equal to the first time threshold, the second time threshold, and the third time threshold as an example, and the fourth time threshold may be 300 milliseconds.

The predetermined fault count threshold may be set according to system performance and/or implementation demands in a specific implementation, and the value of the predetermined fault count threshold is not limited in this embodiment. For example, the predetermined fault count threshold may be 1.

Figure 6:
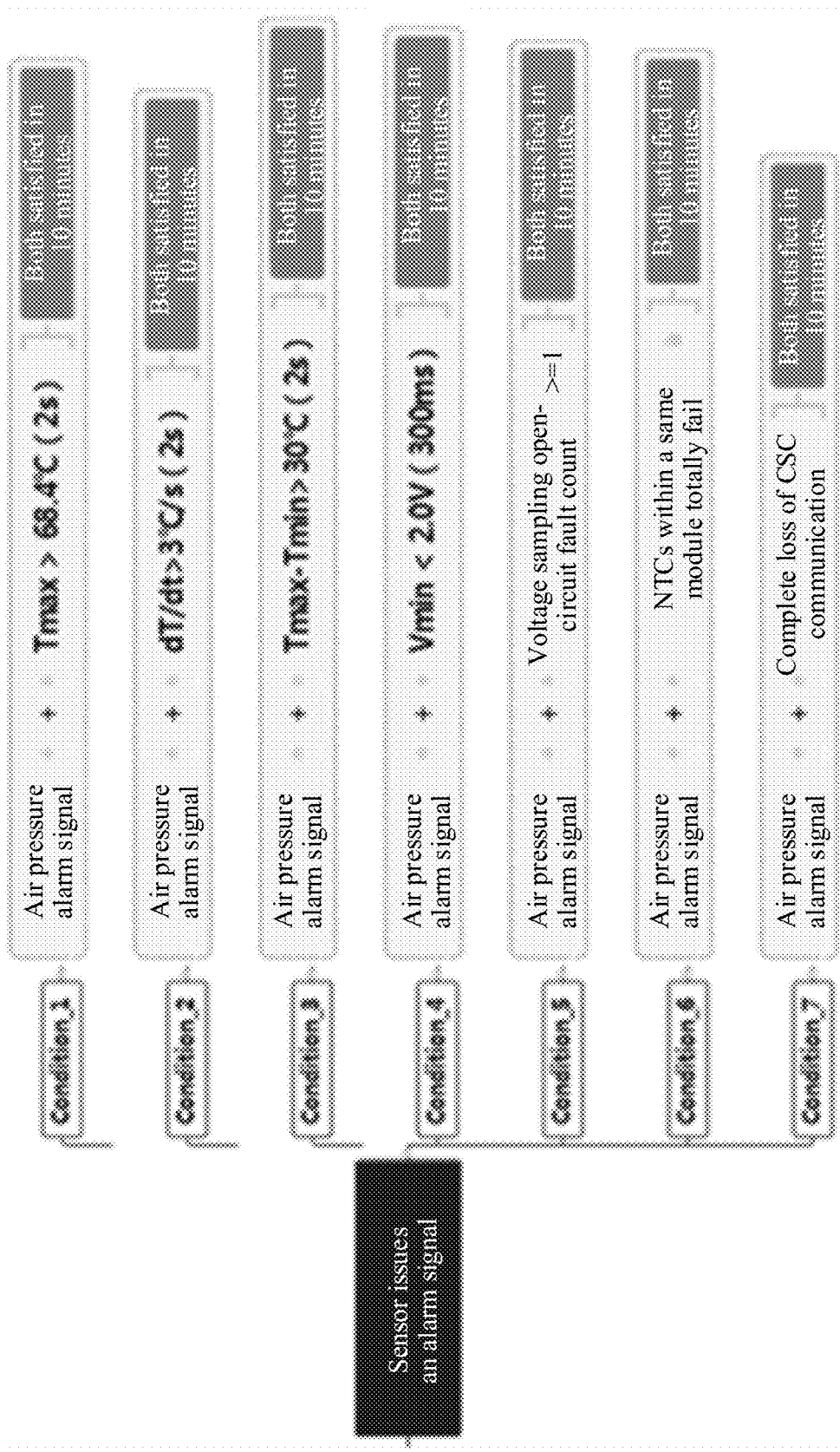
FIG. 6 is a schematic diagram of an embodiment of a thermal runaway alarm policy in the method for detecting battery thermal runaway according to this application.

When the air pressure sensor is in an air pressure alarm state, a policy according to which the BMU generates an alarm signal indicating occurrence of thermal runaway in the battery pack may be as shown in FIG. 6. FIG. 6 is a schematic diagram of an embodiment of a thermal runaway alarm policy in the method for detecting battery thermal runaway according to this application.

In FIG. 6, Tmax is the highest temperature of the battery cell, dT/dt is the temperature rise rate of the battery cell over time, Tmin is the lowest temperature of the battery cell, Vmin is the lowest voltage of the battery cell, and the negative temperature coefficient (Negative Temperature Coefficient, NTC for short) thermistor is a temperature sensor.

In another implementation of the embodiments shown in FIG. 3 and FIG. 5 of this application, the step 103 may be:

when the air pressure sensor is in a normal working state or a faulty state, generating the alarm signal indicating occurrence of thermal runaway in the battery pack if any one or more of fault conditions in the parameter information of the battery pack is/are satisfied; where the fault conditions in the parameter information of the battery pack include:

within a predetermined detection time, a time in which a lowest voltage of a battery cell in the battery pack is lower than the predetermined second voltage threshold exceeds the fourth time threshold, and a time in which a highest temperature of a battery cell in the battery pack is greater than the predetermined temperature threshold exceeds the first time threshold;

within a predetermined detection time, a time in which a lowest voltage of a battery cell in the battery pack is lower than the predetermined second voltage threshold exceeds the fourth time threshold, and a time in which a temperature rise rate of a battery cell in the battery pack over time is greater than the predetermined rise rate threshold exceeds the second time threshold;

within a predetermined detection time, a time in which a lowest voltage of a battery cell in the battery pack is lower than the predetermined second voltage threshold exceeds the fourth time threshold, and a time in which a difference between a highest temperature and a lowest temperature of a battery cell in the battery pack is greater than the predetermined difference threshold exceeds the third time threshold;

within a predetermined detection time, a time in which a temperature rise rate of a battery cell in the battery pack over time is greater than the predetermined rise rate threshold exceeds the second time threshold, and a time in which a highest temperature of a battery cell in the battery pack is greater than the predetermined temperature threshold exceeds the first time threshold;

within a predetermined detection time, a time in which a temperature rise rate of a battery cell in the battery pack over time is greater than the predetermined rise rate threshold exceeds the second time threshold, and a time in which a difference between a highest temperature and a lowest temperature of a battery cell in the battery pack is greater than the predetermined difference threshold exceeds the third time threshold;

a voltage sampling open-circuit fault count of the battery pack is greater than or equal to the predetermined fault count threshold, and a time in which a highest temperature of a battery cell in the battery pack is greater than the predetermined temperature threshold exceeds the first time threshold;

a voltage sampling open-circuit fault count of the battery pack is greater than or equal to the predetermined fault count threshold, and a time in which a temperature rise rate of a battery cell in the battery pack over time is greater than the predetermined rise rate threshold exceeds the second time threshold;

a voltage sampling open-circuit fault count of the battery pack is greater than or equal to the predetermined fault count threshold, and a time in which the difference between a highest temperature and a lowest temperature of a battery cell in the battery pack is greater than the predetermined difference threshold exceeds the third time threshold;

a voltage sampling open-circuit fault count of the battery pack is greater than or equal to the predetermined fault count threshold, and temperature sensors within the same module of the battery pack totally fail; and a charging state of a battery cell in the battery pack satisfies the following conditions, and lasts for a time greater than or equal to a predetermined time: a highest voltage of a battery cell in the battery pack is greater than a predetermined third voltage threshold, and a real value of state of charge of the battery cell in the battery pack is greater than a predetermined threshold, and a charging current of the battery cell in the battery pack is greater than or equal to a predetermined charging current threshold. That is, when the air pressure sensor is in a normal working state or a faulty state, and the parameter information of the battery pack satisfies a fault condition in a charging state, an alarm signal indicating occurrence of thermal runaway in the battery pack is generated. Here, the thermal runaway alarm signal is a warning signal indicating that thermal runaway is in the battery pack. In this way, an overcharge warning function can be implemented for the battery pack, and corresponding measures can be taken in advance to avoid the occurrence of thermal runaway, further improving the safety of the battery pack.

The predetermined time may be set according to system performance and/or implementation demands in a specific implementation, and the length of the predetermined time is not limited in this embodiment. For example, the predetermined time may be 5 seconds. The predetermined third voltage threshold may be set according to system performance and/or implementation demands in a specific implementation, and the value of the predetermined third voltage threshold is not limited in this embodiment. For example, the predetermined third voltage threshold may be 1.1× overvoltage category III. The real value of state of charge (State of Charge, SOC for short) of the battery pack is TRD_SOC. The predetermined voltage may be set according to system performance and/or implementation demands in a specific implementation, and the value of the predetermined threshold is not limited in this embodiment. For example, the predetermined threshold may be 115%. The predetermined charging current threshold may be set according to system performance and/or implementation demands in a specific implementation, and the value of the predetermined charging current threshold is not limited in this embodiment. For example, the predetermined charging current threshold may be 0.33 C.

When the air pressure sensor is in a normal working state or a faulty state, a policy according to which the BMU generates the alarm signal indicating occurrence of thermal runaway in the battery pack may be as shown in FIG. 7. FIG. 7 is a schematic diagram of another embodiment of a thermal runaway alarm policy in the method for detecting battery thermal runaway according to this application.

In existing battery pack thermal runaway alarm policies, a complete loss of CSC communication serves as the only trigger condition to trigger a thermal runaway alarm. Considering that when thermal runaway occurs, it is very likely to damage the CSC communication function, therefore, the complete loss of CSC communication serving as the only trigger condition makes the trigger condition less reliable, so that the thermal runaway false negative rate is high.

The alarm policy shown in FIG. 6 of this application is an alarm policy for the BMU to detect thermal runaway of battery cells with the air pressure sensor added. This policy combines the trigger condition of the complete loss of CSC communication which has a high false negative rate with the air pressure alarm state of the air pressure sensor, while the air pressure alarm state of the air pressure sensor is also considered in combination with other conditions such as voltage and temperature.

However, the alarm policy shown in FIG. 7 of this application gets rid of the trigger condition of the complete loss of CSC communication which has a high false negative rate when the air pressure sensor is in a normal working state or a faulty state, thereby significantly increasing the reliability of the alarm policy.

In the alarm policies shown in FIG. 6 and FIG. 7 of this application, the criterion of being both satisfied in 10 minutes is to prevent that the time to reach an alarm condition is relatively long because the characterizing conditions are not very serious when thermal runaway occurs in the battery cell at low SOC.

Figure 8:
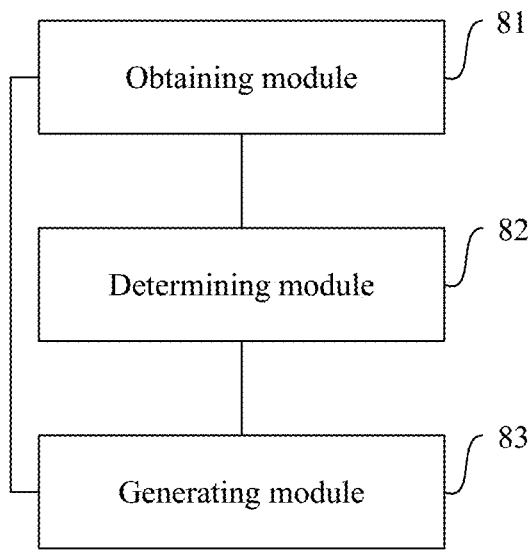
FIG. 8 is a schematic structural diagram of an embodiment of an apparatus for detecting battery thermal runaway according to this application.

FIG. 8 is a schematic structural diagram of an embodiment of an apparatus for detecting battery thermal runaway according to this application. The apparatus for detecting battery thermal runaway may be a BMU or a part of the BMU, to implement the method for detecting battery thermal runaway provided in the embodiments of this application. As shown in FIG. 8, the apparatus for detecting battery thermal runaway may include: an obtaining module 81, a determining module 82, and a generating module 83.

The obtaining module 81 is configured to obtain an output signal of an air pressure sensor located in a battery pack, and obtain parameter information of the battery pack. In this embodiment, the battery pack includes a plurality of battery cells, and the air pressure sensor may be provided in the battery pack. Simulation and experimental results show that the air pressure is distributed evenly across all locations within the battery pack (Pack) when thermal runaway occurs in a battery cell. Therefore, the air pressure sensor may be arranged at any location within the battery pack (Pack).

In a specific implementation, the air pressure sensor may employ a dual-channel air pressure sensor. Certainly, other types of air pressure sensors may be employed, and this is not limited in this embodiment.

The determining module 82 is configured to determine state information of the air pressure sensor based on the output signal of the air pressure sensor obtained by the obtaining module 81.

The generating module 83 is configured to generate an alarm signal indicating occurrence of thermal runaway in the battery pack based on the state information of the air pressure sensor and the parameter information of the battery pack.

In the foregoing apparatus for detecting battery thermal runaway, after the obtaining module 81 obtains the output signal of the air pressure sensor located in the battery pack and obtains the parameter information of the battery pack, the determining module 82 determines the state information of the air pressure sensor based on the output signal of the air pressure sensor, and finally the generating module 83 generates the alarm signal indicating occurrence of thermal runaway in the battery pack based on the state information of the air pressure sensor and the parameter information of the battery pack. In this way, the thermal runaway detection for the battery pack can be implemented by considering parameter information of both the air pressure sensor and the battery pack, improving the reliability of the thermal runaway detection for the battery pack, reducing the probability of false positives and false negatives, and improving driving safety.

Figure 9:
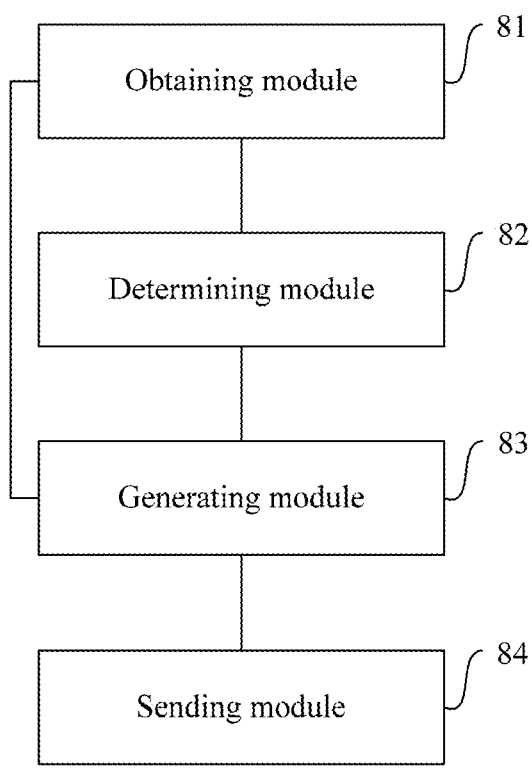
FIG. 9 is a schematic structural diagram of another embodiment of the apparatus for detecting battery thermal runaway according to this application.

FIG. 9 is a schematic structural diagram of another embodiment of the apparatus for detecting battery thermal runaway according to this application. In comparison with the apparatus for detecting battery thermal runaway shown in FIG. 8, the difference is that the apparatus for detecting battery thermal runaway shown in FIG. 9 may further include:

a sending module 84, configured to send the alarm signal indicating occurrence of thermal runaway in the battery pack to a VCU of a vehicle with the battery pack mounted after the generating module 83 generates the alarm signal indicating occurrence of thermal runaway in the battery pack.

Specifically, after the generating module 83 generates the thermal runaway alarm signal, the sending module 84 may send the alarm signal to a VCU of a vehicle with the battery pack mounted. Then the thermal runaway fault occurring in the battery pack is handled by the VCU according to a preset policy, for example, generating a sound and light alarm.

In some embodiments of this embodiment, the obtaining module 81 is specifically configured to obtain an output voltage of the air pressure sensor located in the battery pack when a battery management unit of the battery pack is in a normal working state. The sensor module in FIG. 4 is an air pressure sensor. In this embodiment, when the BMU is working normally, the air pressure sensor is in a normal working state, V1_T is powered up, and a triode is turned on, so that an ASIC starts to work while a Low Power ASIC is not working. At this time, the output signal of the air pressure sensor obtained by the obtaining module 81 is an output voltage value Vout in real time. A voltage value of V1_T may be set according to system performance and/or implementation demands in a specific implementation, and the voltage value of V1_T is not limited in this embodiment. For example, the voltage value of V1_T may be 12.0 V.

The determining module 82 is specifically configured to: determine that the air pressure sensor is in a normal working state when the output voltage of the air pressure sensor is less than a predetermined first voltage threshold; determine that the air pressure sensor is in an air pressure alarm state when the output voltage of the air pressure sensor is greater than or equal to the predetermined first voltage threshold; and determine that the air pressure sensor is in a faulty state when the output voltage of the air pressure sensor is in a predetermined faulty voltage range.

The predetermined first voltage threshold may be set according to system performance and/or implementation demands in a specific implementation, and the value of the predetermined first voltage threshold is not limited in this embodiment. Again, the predetermined faulty voltage range may also be set according to system performance and/or implementation demands in a specific implementation, and the value of the predetermined faulty voltage range is not limited in this embodiment. For example, the predetermined faulty voltage range may be 0-0.2 V and 4.8-5 V.

Considering that the function of detecting thermal runaway may be lost when the air pressure sensor fails, in this embodiment, the air pressure sensor has a self-diagnostic function under a normal working state. Once the output voltage value of the air pressure sensor is within the predetermined faulty voltage range (that is, 0-0.2 V & 4.8-5 V), the determining module 82 determines that the air pressure sensor is in a faulty state. However, the air pressure sensor has no diagnostic function under a low power consumption working state.

Additionally, because what the air pressure sensor detects is air pressure within the pack, considering that different atmospheric pressure in different regions might cause the air pressure sensor to wrongly issue an air pressure alarm signal, a potentiometer may be added in the air pressure sensor so as to calibrate the air pressure alarm threshold within the pack in real time with an outside air pressure value acquired in a normal situation.

In another possible implementation of this embodiment, the obtaining module 81 is specifically configured to obtain a logic signal output from the air pressure sensor located in the battery pack when the BMU of the battery pack is in a sleeping state; where the logic signal may be a TTL signal.

Referring to FIG. 4, when the BMU is in a sleeping state, the air pressure sensor is in a low power consumption working state, V1_T is powered off, and the triode is not turned on, so that the ASIC is not working, while V2_Standby with a constant power is powered by a lead-acid battery, and the Low Power ASIC is working. At this time, the air pressure sensor outputs a TTL signal through a comparator. A voltage value of V2_Standby may be set according to system performance and/or implementation demands in a specific implementation, and the voltage value of V2_Standby is not limited in this embodiment. For example, the voltage value of V2_Standby may be 5.0 V.

The determining module 82 is specifically configured to, when the logic signal is a high level signal, after the BMU of the battery pack is waken up from the sleeping state, determine that the air pressure sensor is in an air pressure alarm state.

Specifically, when the BMU of the battery pack is in a sleeping state, the air pressure sensor outputs a low level signal in a normal situation. At this time, the working state of the BMU does not change, and the BMU remains in the sleeping state; however, when the air pressure sensor outputs a high level signal, the BMU of the battery pack is waken up from the sleeping state and starts to work, and the determining module 82 determines that the air pressure sensor is in an air pressure alarm state.

In this embodiment, the air pressure sensor is capable of monitoring thermal runaway of the battery pack in a low power consumption working state, so that the air pressure sensor can work uninterruptedly, providing the thermal runaway detection and alarm function even when the vehicle stops and is powered down.

In an implementation, the generating module 83 is specifically configured to, when the air pressure sensor is in an air pressure alarm state, generate the alarm signal indicating occurrence of thermal runaway in the battery pack if any one or more of fault conditions in the parameter information of the battery pack is/are satisfied within a predetermined detection time; where the fault conditions in the parameter information of the battery pack include:

a time in which a highest temperature of a battery cell in the battery pack is greater than a predetermined temperature threshold exceeds a first time threshold;

a time in which a temperature rise rate of a battery cell in the battery pack over time is greater than a predetermined rise rate threshold exceeds a second time threshold;

a time in which a difference between a highest temperature and a lowest temperature of a battery cell in the battery pack is greater than a predetermined difference threshold exceeds a third time threshold;

a time in which a lowest voltage of a battery cell in the battery pack is lower than a predetermined second voltage threshold exceeds a fourth time threshold;

a voltage sampling open-circuit fault count of the battery pack is greater than or equal to a predetermined fault count threshold;

temperature sensors within a same module of the battery pack totally fail; and communication between a CSC of the battery pack and the BMU is completely lost.

The predetermined detection time may be set according to system performance and/or implementation demands in a specific implementation, and the length of the predetermined detection time is not limited in this embodiment. For example, the predetermined detection time may be 10 minutes.

The value of the predetermined temperature threshold may be set according to system performance and/or implementation demands in a specific implementation, and the value of the predetermined temperature threshold is not limited in this embodiment. For example, the predetermined temperature threshold may be 68.4° C.

The first time threshold may be set according to system performance and/or implementation demands in a specific implementation, and the length of the first time threshold is not limited in this embodiment. For example, the first time threshold may be 2 seconds.

The temperature rise rate of the battery cell over time is dT/dt, and the predetermined rise rate threshold may be set according to system performance and/or implementation demands in a specific implementation, and the value of the predetermined rise rate threshold is not limited in this embodiment. For example, the predetermined rise rate threshold may be 3° C./s.

The second time threshold may be set according to system performance and/or implementation demands in a specific implementation, and the length of the second time threshold is not limited in this embodiment. For example, the second time threshold may be equal or not equal to the first time threshold, and this is not limited in this embodiment. This embodiment is illustrated by using the second time threshold being equal to the first time threshold as an example, and the second time threshold may be 2 seconds.

The predetermined difference threshold may be set according to system performance and/or implementation demands in a specific implementation, and the value of the predetermined difference threshold is not limited in this embodiment. For example, the predetermined difference threshold may be 30° C.

The third time threshold may be set according to system performance and/or implementation demands in a specific implementation, and the length of the third time threshold is not limited in this embodiment. For example, the third time threshold may be equal or not equal to the first time threshold, and equal or not equal to the second time threshold, and this is not limited in this embodiment. This embodiment is illustrated by using the third time threshold being equal to both the first time threshold and the second time threshold as an example, and the third time threshold may be 2 seconds.

The predetermined second voltage threshold may be set according to system performance and/or implementation demands in a specific implementation, and the value of the predetermined second voltage threshold is not limited in this embodiment. For example, the predetermined second voltage threshold may be 2.0 V.

The fourth time threshold may be set according to system performance and/or implementation demands in a specific implementation, and the length of the fourth time threshold is not limited in this embodiment. For example, the fourth time threshold may be equal or not equal to the first time threshold, the second time threshold, and the third time threshold, and this is not limited in this embodiment. This embodiment is illustrated by using the fourth time threshold being not equal to the first time threshold, the second time threshold, and the third time threshold as an example, and the fourth time threshold may be 300 milliseconds.

The predetermined fault count threshold may be set according to system performance and/or implementation demands in a specific implementation, and the value of the predetermined fault count threshold is not limited in this embodiment. For example, the predetermined fault count threshold may be 1.

When the air pressure sensor is in an air pressure alarm state, a policy according to which the generating module 83 generates an alarm signal indicating occurrence of thermal runaway in the battery pack may be as shown in FIG. 6.

In FIG. 6, Tmax is the highest temperature of the battery cell, dT/dt is the temperature rise rate of the battery cell over time, Tmin is the lowest temperature of the battery cell, Vmin is the lowest voltage of the battery cell, and the NTC is a temperature sensor.

In some embodiments, the generating module 83 is specifically configured to, when the air pressure sensor is in a normal working state or a faulty state, generate the alarm signal indicating occurrence of thermal runaway in the battery pack if any one or more of fault conditions in the parameter information of the battery pack is/are satisfied; where the fault conditions in the parameter information of the battery pack include:

within a predetermined detection time, a time in which a lowest voltage of a battery cell in the battery pack is lower than the predetermined second voltage threshold exceeds the fourth time threshold, and a time in which a highest temperature of a battery cell in the battery pack is greater than the predetermined temperature threshold exceeds the first time threshold;

within a predetermined detection time, a time in which a lowest voltage of a battery cell in the battery pack is lower than the predetermined second voltage threshold exceeds the fourth time threshold, and a time in which a temperature rise rate of a battery cell in the battery pack over time is greater than the predetermined rise rate threshold exceeds the second time threshold;

within a predetermined detection time, a time in which a lowest voltage of a battery cell in the battery pack is lower than the predetermined second voltage threshold exceeds the fourth time threshold, and a time in which a difference between a highest temperature and a lowest temperature of a battery cell in the battery pack is greater than the predetermined difference threshold exceeds the third time threshold;

within a predetermined detection time, a time in which a temperature rise rate of a battery cell in the battery pack over time is greater than the predetermined rise rate threshold exceeds the second time threshold, and a time in which a highest temperature of a battery cell is greater than the predetermined temperature threshold exceeds the first time threshold;

within a predetermined detection time, a time in which a temperature rise rate of a battery cell in the battery pack over time is greater than the predetermined rise rate threshold exceeds the second time threshold, and a time in which a difference between a highest temperature and a lowest temperature of a battery cell in the battery pack is greater than the predetermined difference threshold exceeds the third time threshold;

a voltage sampling open-circuit fault count of a battery cell in the battery pack is greater than or equal to the predetermined fault count threshold, and a time in which a highest temperature of a battery cell in the battery pack is greater than the predetermined temperature threshold exceeds the first time threshold;

a voltage sampling open-circuit fault count of the battery pack is greater than or equal to the predetermined fault count threshold, and a time in which a temperature rise rate of a battery cell in the battery pack over time is greater than the predetermined rise rate threshold exceeds the second time threshold;

a voltage sampling open-circuit fault count of the battery pack is greater than or equal to the predetermined fault count threshold, and a time in which a difference between a highest temperature and a lowest temperature of a battery cell in the battery pack is greater than the predetermined difference threshold exceeds the third time threshold;

a voltage sampling open-circuit fault count of the battery pack is greater than or equal to the predetermined fault count threshold, and temperature sensors within the same module of the battery pack totally fail; and a charging state of a battery cell in the battery pack satisfies the following conditions, and lasts for a time greater than or equal to a predetermined time: a highest voltage of a battery cell in the battery pack is greater than a predetermined third voltage threshold, and a real value of state of charge of the battery cell in the battery pack is greater than a predetermined threshold, and a charging current of the battery cell in the battery pack is greater than or equal to a predetermined charging current threshold. That is, when the air pressure sensor is in a normal working state or a faulty state, and the parameter information of the battery pack satisfies a fault condition in a charging state, an alarm signal indicating occurrence of thermal runaway in the battery pack is generated. Here, the thermal runaway alarm signal is a warning signal indicating that thermal runaway is in the battery pack. In this way, an overcharge warning function can be implemented for the battery pack, and corresponding measures can be taken in advance to avoid the occurrence of thermal runaway, further improving the safety of the battery pack.

The predetermined time may be set according to system performance and/or implementation demands in a specific implementation, and the length of the predetermined time is not limited in this embodiment. For example, the predetermined time may be 5 seconds. The predetermined third voltage threshold may be set according to system performance and/or implementation demands in a specific implementation, and the value of the predetermined third voltage threshold is not limited in this embodiment. For example, the predetermined third voltage threshold may be 1.1× level-3 overvoltage. The real value of SOC of the battery pack is TRD_SOC. The predetermined voltage may be set according to system performance and/or implementation demands in a specific implementation, and the value of the predetermined threshold is not limited in this embodiment. For example, the predetermined threshold may be 115%. The predetermined charging current threshold may be set according to system performance and/or implementation demands in a specific implementation, and the value of the predetermined charging current threshold is not limited in this embodiment. For example, the predetermined charging current threshold may be 0.33 C.

When the air pressure sensor is in a normal working state or a faulty state, a policy according to which the generating module 83 generates the alarm signal indicating occurrence of thermal runaway in the battery pack may be as shown in FIG. 7.

In existing battery pack thermal runaway alarm policies, a complete loss of CSC communication serves as the only trigger condition to trigger a thermal runaway alarm. Considering that when thermal runaway occurs, it is very likely to damage the CSC communication function, therefore, the complete loss of CSC communication serving as the only trigger condition makes the trigger condition less reliable, so that the thermal runaway false negative rate is high.

The alarm policy shown in FIG. 6 of this application is a policy for the generating module 83 to generate a thermal runaway alarm signal with the air pressure sensor is added. This policy combines the trigger condition of the complete loss of CSC communication which has a high false negative rate with the air pressure alarm state of the air pressure sensor, while the air pressure alarm state of the air pressure sensor is also considered in combination with other conditions such as voltage and temperature.

However, the alarm policy shown in FIG. 7 of this application gets rid of the trigger condition of the complete loss of CSC communication which has a high false negative rate when the air pressure sensor is in a normal working state or a faulty state, thereby significantly increasing the reliability of the alarm policy.

In the alarm policies shown in FIG. 6 and FIG. 7 of this application, the criterion of being both satisfied in 10 minutes is to prevent that the time to reach an alarm condition is relatively long because the characterizing conditions are not very serious when thermal runaway occurs in the battery cell at low SOC.

Figure 10:
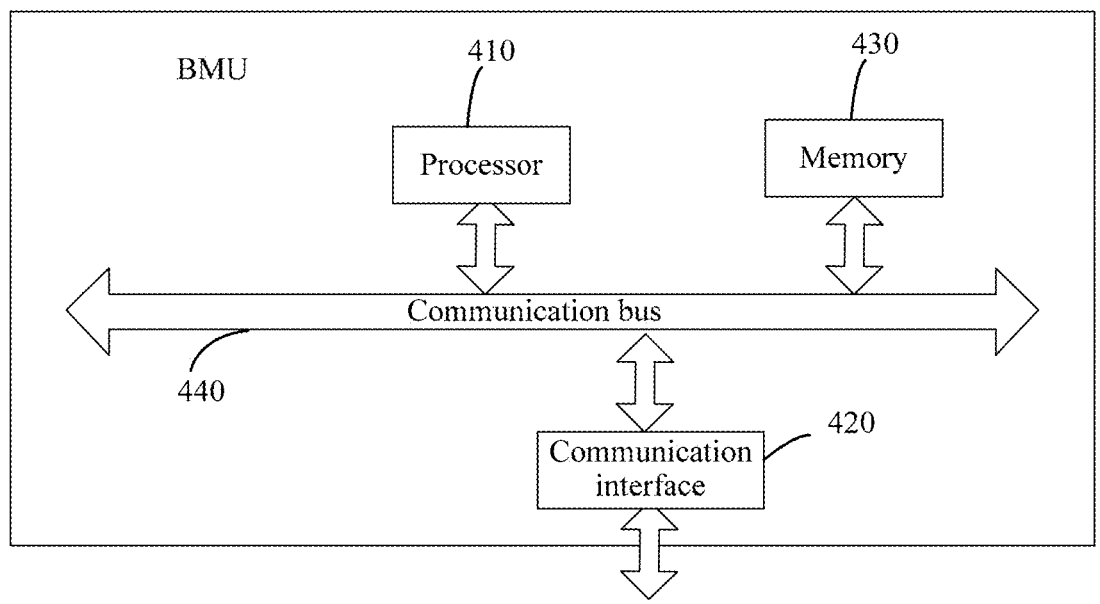
FIG. 10 is a schematic structural diagram of an embodiment of a battery management unit according to this application.

FIG. 10 is a schematic structural diagram of an embodiment of a battery management unit according to this application. The BMU includes a memory, a processor, and a computer program that is stored in the memory and capable of running on the processor, where when the computer program is executed by the processor, the method for detecting battery thermal runaway provided in the embodiments of this application may be implemented.

FIG. 10 shows a block diagram of an example BMU suitable for implementing the embodiments of this application. The BMU shown in FIG. 10 is merely an example, and should bring no limitation on the function and usage scope of the embodiments of this application.

As shown in FIG. 10, the BMU is implemented in the form of a general-purpose computing device. Components of the BMU may include, but are not limited to: one or more processors 410, a memory 430, and a communication bus 440 connecting various system components (including the memory 430 and the processor 410).

The communication bus 440 represents one or more of several types of bus structures, including a memory bus or a memory controller, a peripheral bus, an accelerated graphics port, a processor or a local area bus using any bus structures in a variety of bus structures. For example, these structures include, but are not limited to, a controller area network (Controller Area Network, CAN for short) bus, an industry standard architecture (Industry Standard Architecture, ISA for short) bus, a micro channel architecture (Micro Channel Architecture, MCA for short) bus, an enhanced ISA bus, a video electronics standards association (Video Electronics Standards Association, VESA for short) local area bus, and a peripheral component interconnect (Peripheral Component Interconnection, PCI for short) bus.

The BMU typically includes a plurality of computer system readable media. These media may be any usable media that can be accessed by the BMU, including volatile and non-volatile media, removable and non-removable media.

The memory 430 may include a computer system readable medium in a form of a volatile memory, for example, a random access memory (Random Access Memory, RAM for short) and/or a cache memory. The BMU may further include other removable/non-removable, volatile/non-volatile computer system storage media. Although not shown in FIG. 10, a magnetic disk driver for reading from and writing to a removable, non-volatile disk (such as a "floppy disk") and an optical disc driver for reading from and writing to a removable, non-volatile optical disc (such as, a compact disc read only memory (Compact Disc Read Only Memory, CD-ROM for short), a digital video disc read only memory (Digital Video Disc Read Only Memory, DVD-ROM for short) or other optical media) may be provided. In these cases, each driver may be connected to the communication bus 440 through one or more data medium interfaces. The memory 430 may include at least one program product having a set (for example, at least one) of program modules that are configured to carry out the functions of embodiments of this application.

Programs/utilities, having a set (at least one) of program modules, may be stored in the memory 430. Such program modules include, without limitation, an operating system, one or more application programs, other program modules, and program data, and each of these examples or some combination thereof, may include an implementation of a network environment. The program modules normally perform the functions and/or methods in the embodiments described in this application.

The BMU may also communicate with one or more external devices (for example, an air pressure sensor), and may also communicate with one or more devices enabling a user to interact with the BMU, and/or with any devices (such as a network card or a modem) enabling the BMU to communicate with one or more other computing devices. This communication may take place through a communication interface 420. It should be understood that although not shown in FIG. 10, other hardware and/or software modules that may be utilized in combination with the BMU include, without limitation, microcode, device drivers, redundant processing units, external disk drive arrays, redundant arrays of independent drives (Redundant Arrays of Independent Drives, RAID for short) systems, tape drives and data backup storage systems.

The processor 410 executes various functional applications and data processing by running programs stored in the memory 430, for example, implementing the method for detecting battery thermal runaway provided in the embodiments of this application.

Figure 11:
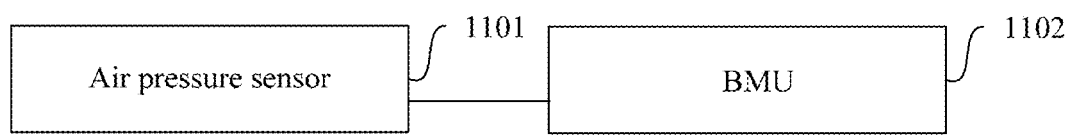
FIG. 11 is a schematic structural diagram of an embodiment of a system for detecting battery thermal runaway according to this application.

FIG. 11 is a schematic structural diagram of an embodiment of a system for detecting battery thermal runaway according to this application. As shown in FIG. 11, the system for detecting battery thermal runaway may include an air pressure sensor 1101 provided in a battery pack and a BMU 1102.

The BMU 1102 is a battery management unit of the battery pack, and may be implemented by the BMU provided in the embodiment shown in FIG. 10 of this application.

In this embodiment, a circuit topological structure diagram of the connection between the air pressure sensor 1101 and the BMU 1102 may be as shown in FIG. 4, and details are not described herein again.

An embodiment of this disclosure further provides a non-transitory computer-readable storage medium, where the computer-readable storage medium stores a computer program, and when the computer program is executed by a processor, the method for detecting battery thermal runaway provided in the embodiments of this application may be implemented.

The non-transitory computer-readable storage medium may employ any combination of one or more computer-readable media. The computer-readable medium may be a computer-readable signal medium or a computer-readable storage medium. The computer-readable storage medium may be, for example without limitation, an electrical, magnetic, optical, electromagnetic, infrared, or semiconductor system, apparatus, or device, or any combination thereof. More specific examples (a non-exhaustive list) of the computer-readable storage medium include: an electrical connection having one or more wires, a portable computer diskette, a hard disk drive, a random access memory (RAM), a read only memory (Read Only Memory, ROM for short), an erasable programmable read only memory (Erasable Programmable Read Only Memory, EPROM for short), a flash memory, an optical fiber, a portable compact disc read only memory (CD-ROM), an optical storage device, a magnetic storage device, or any suitable combination thereof. In this specification, the computer-readable storage medium may be any tangible medium that contains or stores a program for use by or in combination with an instruction execution system, apparatus, or device.

The computer-readable signal medium may include a data signal that is propagated in baseband or as part of a carrier wave, in which computer-readable program code is carried. Such a propagated signal may be in a variety of forms, including but not limited to, an electromagnetic signal, an optical signal, or any suitable combination thereof. The computer-readable signal medium may also be any computer-readable medium except for the computer-readable storage medium, and that computer-readable medium can transmit, propagate, or transport a program for use by or in combination with an instruction execution system, apparatus, or device.

Program code contained in the computer-readable medium may be transmitted using any appropriate medium, including but not limited to wireless connection, electrical wire, optical fiber, cable, radio frequency (Radio Frequency, RF for short), or any suitable combination thereof.

The computer program code for performing operations in this application may be compiled by using one or more programming languages or a combination thereof. The programming languages include object-oriented programming languages such as Java, Smalltalk, C++, and also include conventional procedural programming languages such as "C" language or similar programming languages. The program code may be executed entirely on a user's computer, partly on a user's computer, as a stand-alone software package, partly on a user's computer and partly on a remote computer, or entirely on a remote computer or server. In situations involving a remote computer, the remote computer may be connected to the user's computer through any kind of network, including a local area network (Local Area Network, LAN for short) or a wide area network (Wide Area Network, WAN for short), or it may be connected to an external computer (for example, using an Internet service provider to connect through the Internet).

In the description of this specification, the description referring to the terms "an embodiment", "some embodiments", "an example", "a specific example", or "some examples" means a specific feature, structure, material or characteristic described with reference to the embodiment or example is included in at least one embodiment or example of the this application. In this specification, illustrative expressions of these terms do not necessarily refer to the same embodiment or example. Moreover, the specific feature, structure, material, or characteristic described may be combined in any suitable manner in any one or more embodiments or examples. In addition, without mutual contradiction, those skilled in the art may incorporate and combine different embodiments or examples and features of the different embodiments or examples described in this specification.

In addition, the terms "first" and "second" are merely intended for a purpose of description, and shall not be understood as an indication or implication of relative importance or an implicit indication of the number of the indicated technical features. Therefore, a feature defined by "first" or "second" may explicitly or implicitly include at least one such feature. In the description of this application, the meaning of "plurality" is at least two, for example two or three, unless otherwise specifically defined.

Any process or method in the flowcharts or described in other manners in this specification may be understood to denote a module, segment, or portion of code that includes one or more executable instructions for implementing steps of a specified logical function or process. The scope of the preferred implementations of this application includes additional implementations in which functions may be performed not in the order shown or discussed, but at substantially the same time or in reverse order depending on the involved functions. This should be understood by those skilled in the art to which the embodiments of this application relate.

Depending on the context, the word "if" as used herein may be interpreted as "while" or "when" or "in response to determining" or "in response to detecting". Similarly, depending on the context, the phrases "if determining" or "if detecting (a stated condition or event)" can be interpreted as "when determining" or "in response to determining" or "when detecting (the stated condition or event)" or "in response to detecting (the stated condition or event)".

It should be noted that the terminal involved in the embodiments of this application may include, but are not limited to a personal computer (Personal Computer, PC for short), a personal digital assistant (Personal Digital Assistant, PDA for short), a wireless handheld device, a tablet computer (Tablet Computer), a cellphone, an MP3 player, an MP4 player, and the like.

In the several embodiments provided in this application, it should be understood that the disclosed system, apparatus, and method may be implemented in other manners. For example, the described apparatus embodiments are merely examples. For example, the unit division is merely a logical function division and may be other divisions in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

In addition, functional units in the embodiments of this application may be integrated into one processing unit, or each of the units may exist alone physically, or two or more units are integrated into one unit. The integrated unit may be implemented in a form of hardware, or may be implemented as a combination of hardware and a software functional unit.

When the integrated unit is implemented in a form of a software functional unit, the integrated unit may be stored in a computer-readable storage medium. The software functional unit is stored in a storage medium and includes several instructions for instructing a computer apparatus (which may be a personal computer, a server, a network device, or the like) or a processor (Processor) to perform some of the steps of the methods described in the embodiments of this application. The storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely preferred embodiments of this application, but are not intended to limit this application. Any modification, equivalent replacement, or improvement made without departing from the spirit and principle of this application shall fall within the protection scope of this application.

What is claimed is:

1. A method for detecting battery thermal runaway, comprising:
    obtaining an output voltage of an air pressure sensor located in a battery pack when a battery management unit of the battery pack is in a normal working state, and obtaining parameter information of the battery pack;
    determining state information of the air pressure sensor based on the output voltage of the air pressure sensor, wherein the state information indicates an air pressure alarm state when the output voltage of the air pressure sensor is greater than or equal to a predetermined first voltage threshold;
    determining, in response to a determination that the air pressure sensor is in an air pressure alarm state, whether one or more of fault conditions in the parameter information of the battery pack are satisfied within a predetermined detection time, wherein the fault conditions in the parameter information of the battery pack comprise:
    a time in which a highest temperature of a battery cell in the battery pack is greater than a predetermined temperature threshold exceeds a first time threshold; and
    generating, in response to a determination that the one or more of the fault conditions are satisfied, an alarm signal indicating occurrence of thermal runaway in the battery pack.

2. The method according to claim 1, wherein after the generating an alarm signal indicating occurrence of thermal runaway in the battery pack, the method further comprises:
    sending the alarm signal indicating the occurrence of thermal runaway in the battery pack to a vehicle control unit of a vehicle with the battery pack mounted.

3. The method according to claim 1, wherein the determining state information of the air pressure sensor based on the output voltage of the air pressure sensor further comprises:

determining that the air pressure sensor is in a normal working state when the output voltage of the air pressure sensor is less than a predetermined first voltage threshold; and
determining that the air pressure sensor is in a faulty state when the output voltage of the air pressure sensor is in a predetermined faulty voltage range.

4. The method according to claim 3, wherein when the air pressure sensor is in a normal working state or a faulty state, the fault conditions in the parameter information of the battery pack further comprise:
within a predetermined detection time, a time in which a lowest voltage of a battery cell in the battery pack is lower than a predetermined second voltage threshold exceeds a fourth time threshold, and a time in which a highest temperature of a battery cell in the battery pack is greater than a predetermined temperature threshold exceeds a first time threshold;
within a predetermined detection time, a time in which a lowest voltage of a battery cell in the battery pack is lower than the predetermined second voltage threshold exceeds the fourth time threshold, and a time in which a temperature rise rate of a battery cell in the battery pack over time is greater than a predetermined rise rate threshold exceeds a second time threshold;
within a predetermined detection time, a time in which a lowest voltage of a battery cell in the battery pack is lower than the predetermined second voltage threshold exceeds the fourth time threshold, and a time in which a difference between a highest temperature and a lowest temperature of a battery cell in the battery pack is greater than a predetermined difference threshold exceeds a third time threshold;
within a predetermined detection time, a time in which a temperature rise rate of a battery cell in the battery pack over time is greater than the predetermined rise rate threshold exceeds the second time threshold, and a time in which a highest temperature of a battery cell in the battery pack is greater than the predetermined temperature threshold exceeds the first time threshold;
within a predetermined detection time, a time in which a temperature rise rate of a battery cell in the battery pack over time is greater than the predetermined rise rate threshold exceeds the second time threshold, and a time in which a difference between a highest temperature and a lowest temperature of a battery cell in the battery pack is greater than the predetermined difference threshold exceeds the third time threshold;
a voltage sampling open-circuit fault count of the battery pack is greater than or equal to a predetermined fault count threshold, and a time in which a highest temperature of a battery cell in the battery pack is greater than the predetermined temperature threshold exceeds the first time threshold;
a voltage sampling open-circuit fault count of the battery pack is greater than or equal to the predetermined fault count threshold, and a time in which a temperature rise rate of a battery cell in the battery pack over time is greater than the predetermined rise rate threshold exceeds the second time threshold;
a voltage sampling open-circuit fault count of the battery pack is greater than or equal to the predetermined fault count threshold, and a time in which a difference between a highest temperature and a lowest temperature of a battery cell in the battery pack is greater than the predetermined difference threshold exceeds the third time threshold;
a voltage sampling open-circuit fault count of the battery pack is greater than or equal to the predetermined fault count threshold, and temperature sensors within a same module of the battery pack totally fail; and
a charging state of a battery cell in the battery pack satisfies the following conditions, and lasts for a time greater than or equal to a predetermined time: a highest voltage of a battery cell in the battery pack is greater than the predetermined third voltage threshold, and a real value of state of charge of the battery cell in the battery pack is greater than a predetermined threshold, and a charging current of the battery cell in the battery pack is greater than or equal to a predetermined charging current threshold.

5. The method according to claim 1, wherein the fault conditions in the parameter information of the battery pack further comprise:
a time in which a temperature rise rate of a battery cell in the battery pack over time is greater than a predetermined rise rate threshold exceeds a second time threshold;
a time in which a difference between a highest temperature and a lowest temperature of a battery cell in the battery pack is greater than a predetermined difference threshold exceeds a third time threshold;
a time in which a lowest voltage of a battery cell in the battery pack is lower than a predetermined second voltage threshold exceeds a fourth time threshold;
a voltage sampling open-circuit fault count of the battery pack is greater than or equal to a predetermined fault count threshold;
temperature sensors within a same module of the battery pack totally fail; and
communication between a cell supervision circuit of the battery pack and the battery management unit is completely lost.

6. An apparatus for detecting battery thermal runaway, comprising:
an obtaining module, configured to obtain an output voltage of an air pressure sensor located in a battery pack when a battery management unit of the battery pack is in a normal working state, and obtaining parameter information of the battery pack;
a determining module, configured to:
determine state information of the air pressure sensor based on the output voltage of the air pressure sensor obtained by the obtaining module, wherein the state information indicates an air pressure alarm state when the output voltage of the air pressure sensor is greater than or equal to a predetermined first voltage threshold; and
determine, in response to a determination that the air pressure sensor is in an air pressure alarm state, whether one or more of fault conditions in the parameter information of the battery pack are satisfied within a predetermined detection time, wherein the fault conditions in the parameter information of the battery pack comprise:
a time in which a highest temperature of a battery cell in the battery pack is greater than a predetermined temperature threshold exceeds a first time threshold; and
a generating module, configured to generate, in response to a determination that the one or more of the fault conditions are satisfied, an alarm signal indicating occurrence of thermal runaway in the battery pack.

7. The apparatus according to claim 6, further comprising:
a sending module, configured to send the alarm signal indicating occurrence of thermal runaway in the battery pack to a vehicle control unit of a vehicle with the battery pack mounted after the generating module generates the alarm signal indicating occurrence of thermal runaway in the battery pack.

8. The apparatus according to claim 6, wherein
the determining module is configured to: determine that the air pressure sensor is in a normal working state when the output voltage of the air pressure sensor is less than a predetermined first voltage threshold; and determine that the air pressure sensor is in a faulty state when the output voltage of the air pressure sensor is in a predetermined faulty voltage range.

9. The apparatus according to claim 8, wherein
when the air pressure sensor is in a normal working state or a faulty state, the fault conditions in the parameter information of the battery pack further comprise:
within a predetermined detection time, a time in which a lowest voltage of a battery cell in the battery pack is lower than a predetermined second voltage threshold exceeds a fourth time threshold, and a time in which a highest temperature of a battery cell in the battery pack is greater than a predetermined temperature threshold exceeds a first time threshold;
within a predetermined detection time, a time in which a lowest voltage of a battery cell in the battery pack is lower than the predetermined second voltage threshold exceeds the fourth time threshold, and a time in which a temperature rise rate of a battery cell in the battery pack over time is greater than a predetermined rise rate threshold exceeds a second time threshold;
within a predetermined detection time, a time in which a lowest voltage of a battery cell in the battery pack is lower than the predetermined second voltage threshold exceeds the fourth time threshold, and a time in which a difference between a highest temperature and a lowest temperature of a battery cell in the battery pack is greater than a predetermined difference threshold exceeds a third time threshold;
within a predetermined detection time, a time in which a temperature rise rate of a battery cell in the battery pack over time is greater than the predetermined rise rate threshold exceeds the second time threshold, and a time in which a highest temperature of a battery cell in the battery pack is greater than the predetermined temperature threshold exceeds the first time threshold;
within a predetermined detection time, a time in which a temperature rise rate of a battery cell in the battery pack over time is greater than the predetermined rise rate threshold exceeds the second time threshold, and a time in which a difference between a highest temperature and a lowest temperature of a battery cell in the battery pack is greater than the predetermined difference threshold exceeds the third time threshold;
a voltage sampling open-circuit fault count of the battery pack is greater than or equal to a predetermined fault count threshold, and a time in which a highest temperature of a battery cell in the battery pack is greater than the predetermined temperature threshold exceeds the first time threshold;
a voltage sampling open-circuit fault count of the battery pack is greater than or equal to the predetermined fault count threshold, and a time in which a temperature rise rate of a battery cell in the battery pack over time is greater than the predetermined rise rate threshold exceeds the second time threshold;
a voltage sampling open-circuit fault count of the battery pack is greater than or equal to the predetermined fault count threshold, and a time in which a difference between a highest temperature and a lowest temperature of a battery cell in the battery pack is greater than the predetermined difference threshold exceeds the third time threshold;
a voltage sampling open-circuit fault count of the battery pack is greater than or equal to the predetermined fault count threshold, and temperature sensors within a same module of the battery pack totally fail; and
a charging state of a battery cell in the battery pack satisfies the following conditions, and lasts for a time greater than or equal to a predetermined time: a highest voltage of a battery cell in the battery pack is greater than the predetermined third voltage threshold, and a real value of state of charge of the battery cell in the battery pack is greater than a predetermined threshold, and a charging current of the battery cell in the battery pack is greater than or equal to a predetermined charging current threshold.

10. The apparatus according to claim 6, wherein the fault conditions in the parameter information of the battery pack further comprise:
a time in which a temperature rise rate of a battery cell in the battery pack over time is greater than a predetermined rise rate threshold exceeds a second time threshold;
a time in which a difference between a highest temperature and a lowest temperature of a battery cell in the battery pack is greater than a predetermined difference threshold exceeds a third time threshold;
a time in which a lowest voltage of a battery cell in the battery pack is lower than a predetermined second voltage threshold exceeds a fourth time threshold;
a voltage sampling open-circuit fault count of the battery pack is greater than or equal to a predetermined fault count threshold;
temperature sensors within a same module of the battery pack totally fail; and
communication between a cell supervision circuit of the battery pack and the battery management unit is completely lost.

11. A battery management unit, comprising a memory, a processor, and a plurality of computer programs stored in the memory that, when executed by the processor, cause the battery management unit to:
obtain an output voltage of an air pressure sensor located in a battery pack when a battery management unit of the battery pack is in a normal working state, and obtaining parameter information of the battery pack;
determine state information of the air pressure sensor based on the output voltage of the air pressure sensor, wherein the state information indicates an air pressure alarm state when the output voltage of the air pressure sensor is greater than or equal to a predetermined first voltage threshold;
determine, in response to a determination that the air pressure sensor is in an air pressure alarm state, whether one or more of fault conditions in the parameter information of the battery pack are satisfied within a predetermined detection time, wherein the fault conditions in the parameter information of the battery pack comprise:

a time in which a highest temperature of a battery cell in the battery pack is greater than a predetermined temperature threshold exceeds a first time threshold; and generate, in response to a determination that the one or more of the fault conditions are satisfied, an alarm signal indicating occurrence of thermal runaway in the battery pack.

12. The battery management unit according to claim 11, wherein the battery management unit is further configured to: after generating an alarm signal indicating occurrence of thermal runaway in the battery pack, send the alarm signal indicating the occurrence of thermal runaway in the battery pack to a vehicle control unit of a vehicle with the battery pack mounted.

13. The battery management unit according to claim 11, wherein the plurality of computer programs, when executed by the processor, further cause the battery management unit to:

determine that the air pressure sensor is in a normal working state when the output voltage of the air pressure sensor is less than a predetermined first voltage threshold; and determine that the air pressure sensor is in a faulty state when the output voltage of the air pressure sensor is in a predetermined faulty voltage range.

14. The battery management unit according to claim 13, wherein the fault conditions in the parameter information of the battery pack further comprise:

a time in which a temperature rise rate of a battery cell in the battery pack over time is greater than a predetermined rise rate threshold exceeds a second time threshold;

a time in which a difference between a highest temperature and a lowest temperature of a battery cell in the battery pack is greater than a predetermined difference threshold exceeds a third time threshold;

a time in which a lowest voltage of a battery cell in the battery pack is lower than a predetermined second voltage threshold exceeds a fourth time threshold;

a voltage sampling open-circuit fault count of the battery pack is greater than or equal to a predetermined fault count threshold;

temperature sensors within a same module of the battery pack totally fail; and communication between a cell supervision circuit of the battery pack and the battery management unit is completely lost.

15. The battery management unit according to claim 13, wherein when the air pressure sensor is in a normal working state or a faulty state, the fault conditions in the parameter information of the battery pack further comprise:

within a predetermined detection time, a time in which a lowest voltage of a battery cell in the battery pack is lower than a predetermined second voltage threshold exceeds a fourth time threshold, and a time in which a highest temperature of a battery cell in the battery pack is greater than a predetermined temperature threshold exceeds a first time threshold;

within a predetermined detection time, a time in which a lowest voltage of a battery cell in the battery pack is lower than the predetermined second voltage threshold exceeds the fourth time threshold, and a time in which a temperature rise rate of a battery cell in the battery pack over time is greater than a predetermined rise rate threshold exceeds a second time threshold;

within a predetermined detection time, a time in which a lowest voltage of a battery cell in the battery pack is lower than the predetermined second voltage threshold exceeds the fourth time threshold, and a time in which a difference between a highest temperature and a lowest temperature of a battery cell in the battery pack is greater than a predetermined difference threshold exceeds a third time threshold;

within a predetermined detection time, a time in which a temperature rise rate of a battery cell in the battery pack over time is greater than the predetermined rise rate threshold exceeds the second time threshold, and a time in which a highest temperature of a battery cell in the battery pack is greater than the predetermined temperature threshold exceeds the first time threshold;

within a predetermined detection time, a time in which a temperature rise rate of a battery cell in the battery pack over time is greater than the predetermined rise rate threshold exceeds the second time threshold, and a time in which a difference between a highest temperature and a lowest temperature of a battery cell in the battery pack is greater than the predetermined difference threshold exceeds the third time threshold;

a voltage sampling open-circuit fault count of the battery pack is greater than or equal to a predetermined fault count threshold, and a time in which a highest temperature of a battery cell in the battery pack is greater than the predetermined temperature threshold exceeds the first time threshold;

a voltage sampling open-circuit fault count of the battery pack is greater than or equal to the predetermined fault count threshold, and a time in which a temperature rise rate of a battery cell in the battery pack over time is greater than the predetermined rise rate threshold exceeds the second time threshold;

a voltage sampling open-circuit fault count of the battery pack is greater than or equal to the predetermined fault count threshold, and a time in which a difference between a highest temperature and a lowest temperature of a battery cell in the battery pack is greater than the predetermined difference threshold exceeds the third time threshold;

a voltage sampling open-circuit fault count of the battery pack is greater than or equal to the predetermined fault count threshold, and temperature sensors within a same module of the battery pack totally fail; and a charging state of a battery cell in the battery pack satisfies the following conditions, and lasts for a time greater than or equal to a predetermined time: a highest voltage of a battery cell in the battery pack is greater than the predetermined third voltage threshold, and a real value of state of charge of the battery cell in the battery pack is greater than a predetermined threshold, and a charging current of the battery cell in the battery pack is greater than or equal to a predetermined charging current threshold.

* * * * *